United States Patent
Johns

(10) Patent No.: US 10,992,759 B2
(45) Date of Patent: Apr. 27, 2021

(54) WEB APPLICATION SESSION SECURITY WITH PROTECTED SESSION IDENTIFIERS

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 16/002,399

(22) Filed: Jun. 7, 2018

(65) Prior Publication Data

US 2019/0379744 A1    Dec. 12, 2019

(51) Int. Cl.
*H04L 29/08* (2006.01)
*H04L 29/06* (2006.01)

(52) U.S. Cl.
CPC .......... *H04L 67/141* (2013.01); *H04L 63/101* (2013.01); *H04L 67/146* (2013.01)

(58) Field of Classification Search
CPC ..... G06F 13/00; H04J 3/16; H04J 3/18; H04J 3/22; H04L 12/28; H04L 12/56; H04L 12/288; H04L 12/4608; H04L 12/4641; H04L 12/4645; H04L 29/06; H04L 29/08; H04L 29/0653; H04L 29/0809; H04L 29/06095; H04L 29/08009; H04L 29/08072; H04L 47/10; H04L 49/351; H04L 63/08; H04L 63/101; H04L 63/102; H04L 67/141; H04L 67/146; H04L 69/14; H04L 67/00; H04Q 11/0478; H04W 80/02; Y02D 50/30
USPC ...................... 370/389, 395.53, 469; 709/229
See application file for complete search history.

(56) References Cited

U.S. PATENT DOCUMENTS

| | | |
|---|---|---|
| 6,874,084 B1 | 3/2005 | Dobner |
| 7,478,434 B1 | 1/2009 | Hinton et al. |
| 8,024,369 B2 | 9/2011 | Pellegrini et al. |
| 8,397,283 B2 | 3/2013 | Hayler et al. |
| 8,856,869 B1 | 10/2014 | Brinskelle |
| 8,949,938 B2 | 2/2015 | Sowatskey et al. |
| 9,294,479 B1 | 3/2016 | Koulomzin |
| 9,544,293 B2 | 1/2017 | Mathew et al. |
| 9,769,205 B2 | 9/2017 | Gopinath et al. |
| 10,110,687 B2 | 10/2018 | Bahadori et al. |
| 10,148,726 B1 | 12/2018 | Feller |
| 2004/0098620 A1 | 5/2004 | Shay |

(Continued)

OTHER PUBLICATIONS

"U.S. Appl. No. 16/002,372, Non Final Office Action dated May 12, 2020", 23 pgs.

(Continued)

*Primary Examiner* — Robert B Harrell
(74) *Attorney, Agent, or Firm* — Schwegman Lundberg & Woessner, P.A.

(57) ABSTRACT

Various examples are directed to systems and methods for secure communication sessions between a web application and a server. A session vault routine executing at a computing device may receive a first request message directed to a server computing device. The first request message may comprise a client session identifier at a session identifier field of the first request message. The session vault routine may access supplemental session identifier data from a session vault persistence at the data storage. The session vault routine may write the supplemental session identifier data to a second field of the first request message, and initiate sending the first request message to the server computing device.

20 Claims, 17 Drawing Sheets

(56) References Cited

U.S. PATENT DOCUMENTS

| | | |
|---|---|---|
| 2006/0031442 A1 | 2/2006 | Ashley et al. |
| 2007/0081557 A1* | 4/2007 | Binetti .................... H04L 69/14 370/469 |
| 2007/0282851 A1 | 12/2007 | Wingfield et al. |
| 2008/0263650 A1 | 10/2008 | Kerschbaum |
| 2009/0193129 A1 | 7/2009 | Agarwal et al. |
| 2009/0292925 A1 | 11/2009 | Meisel |
| 2009/0328187 A1 | 12/2009 | Meisel |
| 2010/0325418 A1 | 12/2010 | Kanekar |
| 2011/0225090 A1 | 9/2011 | Hammad |
| 2013/0055289 A1 | 2/2013 | Maltese et al. |
| 2013/0332618 A1 | 12/2013 | Kasivajjula et al. |
| 2014/0304499 A1 | 10/2014 | Gopinath et al. |
| 2015/0039908 A1 | 2/2015 | Lee et al. |
| 2016/0381000 A1 | 12/2016 | Mathew et al. |
| 2017/0222984 A1 | 8/2017 | Kanekar |
| 2018/0109540 A1 | 4/2018 | Amar et al. |
| 2018/0205554 A1 | 7/2018 | Blinn |
| 2018/0337905 A1 | 11/2018 | Ogle |
| 2018/0351958 A1 | 12/2018 | Sakurai |
| 2019/0057204 A1 | 2/2019 | Marcovecchio et al. |
| 2019/0379675 A1 | 12/2019 | Johns |

OTHER PUBLICATIONS

U.S. Appl. No. 16/002,372, filed Jun. 7, 2018, Web Application Session Security.

"U.S. Appl. No. 16/002,372, Examiner Interview Summary dated Nov. 17, 2020", 3 pgs.

"U.S. Appl. No. 16/002,372, Final Office Action dated Oct. 9, 2020", 25 pgs.

"U.S. Appl. No. 16/002,372, Notice of Allowance dated Dec. 9, 2020", 11 pgs.

"U.S. Appl. No. 16/002,372, Response filed Aug. 3, 2020 to Non Final Office Action dated May 12, 2020", 12 pgs.

"U.S. Appl. No. 16/002,372, Response filed Nov. 18, 2020 to Final Office Action dated Oct. 9, 2020", 12 pgs.

Aqrabi, AL, et al., "A Multi-layer Hierarchical Inter-cloud Connectivity Model for Sequential Packet Inspection of Tenant Sessions Accessing BI as a Service", IEEE Inti Conf on High Performance Computing and Communications, (2014), 498-505.

Barth, Adam, et al., "Robust defenses for cross-site request forgery", CCS, (2008), 75-88.

McDaniel, Brian, et al., "The Cloud Browser web application framework", Proceedings of the 3rd annual conference on Systems, programming, and applications: software for humanity, (2012), 141-156.

\* cited by examiner

WEB APPLICATION SESSION SECURITY WITH PROTECTED SESSION IDENTIFIERS

TECHNICAL FIELD

This document generally relates to methods and systems for use with computer devices, including networked computing devices. More particularly, this document relates to systems and methods for secure web application communications utilizing a session identifier routine.

BACKGROUND

Web applications are typically executed in a web browser application to provide a user interface (UI) to a user. When executed, web applications are able to make request messages directed to remote servers. For example, web applications may request UI content from a web server, send transaction information to a merchant server, etc.

BRIEF DESCRIPTION OF DRAWINGS

The present disclosure is illustrated by way of example, and not limitation, in the following figures.

DETAILED DESCRIPTION

Figure 1:
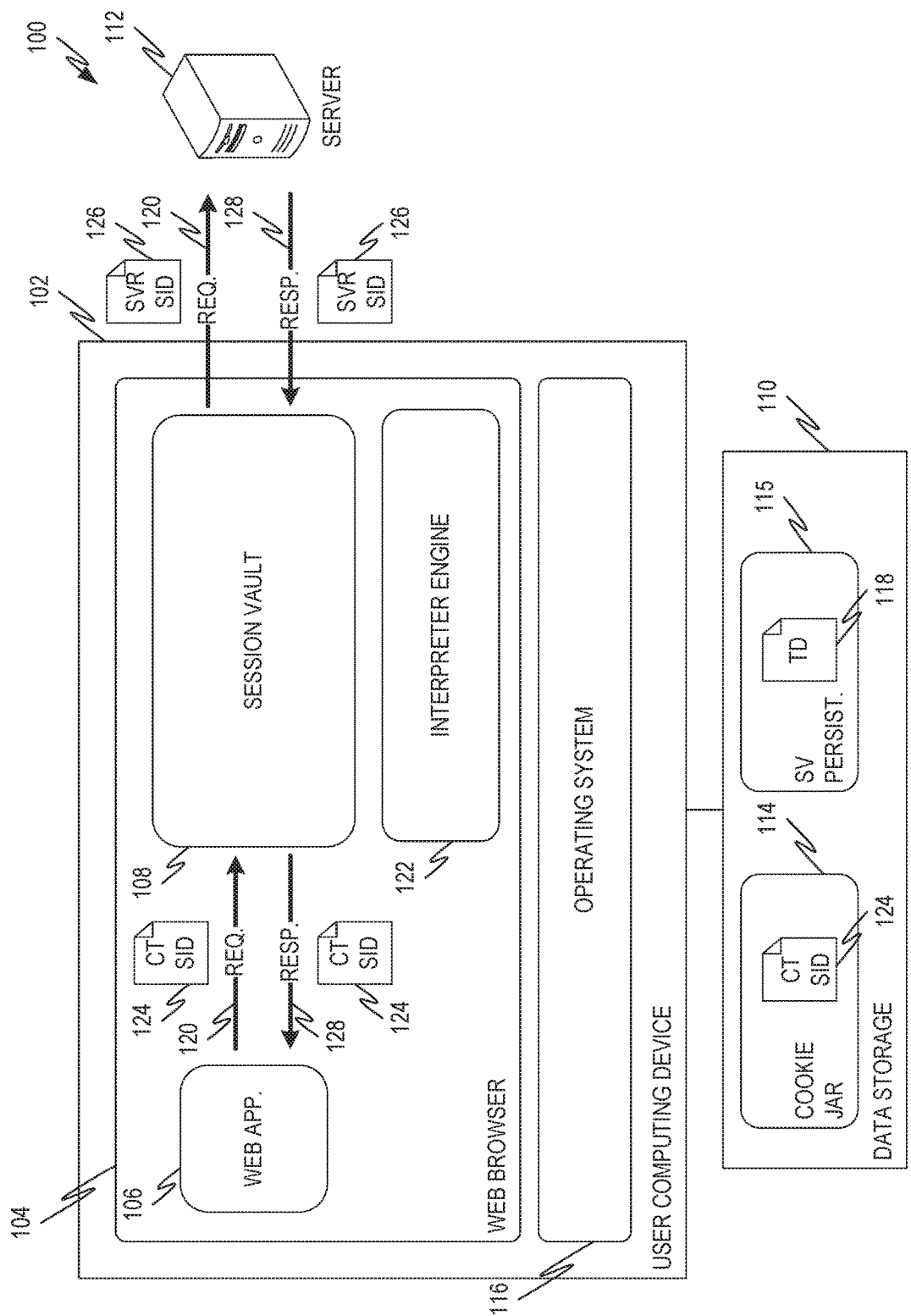
FIG. 1 is a diagram showing one example of an environment for implementing web application security with a session identifier routine.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods that utilize a session identifier routine to reduce the vulnerability of web applications to malicious code.

A web application executing at a client computing device communicates with a server utilizing a stateless protocol, such as Hypertext Transfer Protocol (HTTP). In some examples, it is desirable to associate multiple messages between the web application and the server with a single usage session or session. Consider an example in which the web application authenticates to the server. In a first request message, the web application sends authentication data to the server, such as a user name, password, person identification number (PIN), or other data identifying the web application or a user thereof. After authenticating, the web application may send a subsequent request message that instructs the server to perform a particular function on behalf of the authenticated web application. Before initiating the function, it is desirable for the server to verify that the subsequent request message was received from the same source that provided the authentication data.

In various examples, the web application and server utilize session identifiers to mark messages that are part of a common session. A session identifier is agreed to by the web application and server. On the client side, a web browser or other application layer routine adds the session identifier to request messages that are part of the session. The server receives the request messages and is able to identify them as part of the session by verifying the session identifier. Similarly, an application layer routine at the server adds the session identifier response messages directed to the web application that are part of the session. The web browser and/or web application receives the response messages and is able to identify them as part of the session also by verifying the session identifier. Consider an example in which the server receives authentication data in a request message associated with a first session identifier. The server can determine whether subsequent request messages should be associated with the same authentication data by determining whether the subsequent messages include the first session identifier.

Communication sessions using session identifiers, however, can still be vulnerable to attack. For example, an attacker can steal and/or use a stolen session identifier to impersonate the web application to the server. The attacker uses the stolen session identifier to send unauthorized request messages to the server. Because the unauthorized messages include the proper, but stolen, session identifier, the server can be tricked into performing unauthorized operations.

Various vulnerabilities to session identifier theft originate at the web application and the web browser (or other application layer tool). For example, session identifiers are often processed as HTTP cookies and stored at the web browser's cookie storage location, referred to as a "cookie jar." An attacker can use malicious code to steal a session identifier by accessing the web browser cookie jar. Other session identifier vulnerabilities occur when malicious code hijacks the web application or web browser, tricking the web application or web browser into providing a session identifier or using a session identifier generated by the malicious code.

Various examples described herein are directed to a session identifier routine that is logically positioned between the web application and the server. The session identifier routine intercepts messages between the web application and the server and transforms the session identifiers. This allows the server side (e.g., the server) and the client side (e.g., the web application and/or web browser) to use distinct session identifiers. The web application and web browser use a client session identifier that is not provided to or by the server. Similarly, the server uses a server session identifier that is not provided to the web application or to the web browser. The session identifier routine intercepts messages between the server and the web application or web browser and performs a suitable transformation on the session identifier. For example, a request message directed to the server may initially include a client session identifier at a session identifier field. The session identifier routine intercepts the request message and transforms the client session identifier to a corresponding server session identifier. The session identifier routine adds the server session identifier to the request message and sends the request message to the server. Similarly, a response message directed to the web application or web browser by the server initially includes the server session identifier. The session identifier routine intercepts the response message and transforms the server session identifier into the corresponding client session identifier. The session identifier routine removes the server session identifier from the response message and adds the client session identifier. The response message, with the client session identifier, is then provided to the web browser and web application.

A session identifier routine, as described herein, may increase the security of communications between the web application and the server, for example, by making it more difficult to effectively steal the session identifier. For example, even if an attacker successfully steals the client session identifier by compromising the browser cookie jar or hijacking the web application, the server will not recognize the client session identifier unless it is first transformed into the server session identifier by the session identifier routine. Accordingly, if a malicious actor steals the client session identifier alone, it may not be able to successfully impersonate the web application to the server.

FIG. 1 is a diagram showing one example of an environment 100 for implementing web application security with a session identifier routine 108. The environment 100 includes a user computing device 102 that is in communication with a server 112, which may be a web server. The user computing device 102 may be or include any suitable computing device, such as, for example, a desktop computer, a laptop computer, a tablet computer, a mobile phone, etc. Similarly, the server 112 may be or include any suitable computing devices. The server 112 may execute one or more web server routines that provide content and/or perform operations in response to request messages. Examples of hardware and software arrangements for computing devices that may make up all or part of the user computing device 102 and/or server 112 are provided herein with reference to FIGS. 16 and 17 described herein.

The user computing device 102 includes data storage 110. The data storage 110 may include one or more hardware devices for storing data. Example hardware devices for storing data include memory, such as Random Access Memory (RAM), persistent storage such as, for example, one or more disk drives, one or more solid state drives, etc. The data storage 110 includes various example storage locations 115, 114. Storage locations 115, 114 include portions of one or more of the hardware devices making up the data storage 110 that are available to applications and routines to store data. Access to storage locations 115, 114 may be managed by an operating system (OS) 116 of the user computing device 102.

In the example shown in FIG. 1, the user computing device 102 executes a web browser 104. The web browser 104 may be or include any suitable web browser including, for example, the Chrome® browser available from Google Inc., the Firefox® browser available from Mozilla Foundation, the Safari® browser available from Apple Inc., the Internet Explorer® browser available from Microsoft Corporation, the Microsoft Edge® browser available from Microsoft Corporation. The web browser 104 displays content and, as described herein, facilitates the execution of the web application 106. The web browser 104 is associated with a storage location 114 that is used for storing session identifiers, such as client session identifiers 124. The web browser 104, in some examples, implements session identifiers as HTTP cookies. In examples where the web browser 104 implements session identifiers as HTTP cookies, the storage location 114 is sometimes referred to as the browser cookie jar 114.

In the example of FIG. 1, the user computing device 102 executes the web application 106 and/or the session identifier routine 108 in the web browser 104. For example, the web browser 104 may include an interpreter engine 122, such as a JavaScript engine or other suitable interpreter engine. The interpreter engine 122 receives and executes interpreted code, such as web application code for executing the web application 106 and session vault code for executing the session identifier routine 108.

A user of the user computing device 102 accesses the web application 106 by launching the web browser 104 and selecting a Universal Resource Locator (URL) or other address associated with the server 112. The web browser 104 sends to the server 112 a request for the web application 106 and receives, in reply, the web application code. The web application code may be in any suitable form. In some examples, the web application code is in an interpreted language, such as Hypertext Transfer Protocol (HTTP), JavaScript, etc. In some examples, the web application code includes or is accompanied by other content such as text content, media content, etc., that is rendered by the web browser 104. The web browser 104 may also request and receive session vault code for executing the session identifier routine 108. The session vault code, in some examples, is also in an interpreted language such as HTTP, JavaScript, etc. Session vault code may be received from the server 112 and/or another server. In some examples, the session vault code is received from the server 112 with the web application code. For example, the web root of the web application 106 may include the session vault code.

The web browser 104 executes the web application 106, for example, utilizing the interpreter engine 122. Upon execution, the web application 106 registers the session identifier routine 108. For example, the web application code, e.g., from an entry page, may include code that instantiates the session identifier routine 108. Example code for instantiating a session identifier routine 108 from session vault code called "SessionVault.js" is provided below:

1<head>
2<script src="/SessionVault.js"></script>
3</head>

Registering the session identifier routine 108 includes instantiating or initiating execution of the session identifier routine 108 and defining a web origin, also referred to as a scope of the session identifier routine 108. The scope of the session identifier routine 108 describes the messages that are to be intercepted by the session identifier routine 108. For example, the scope may be described by a URL, a set of URLs, or other suitable addresses. The web browser 104 is programmed to route messages within the scope of the session identifier routine 108 to the session identifier routine 108 for processing, as described herein. In some examples, the web browser 104 is programmed to activate the session identifier routine 108 to process same-origin request messages within the scope as well as all navigation requests to the scope. Also, in some examples, the session identifier routine 108 is not activated for non-navigation, cross-origin messages.

The session identifier routine 108, in some examples, is persistent. For example, after the session identifier routine 108 is registered in the web browser 104, it may remain active even after the web browser 104 restarts and, in some examples, even after the web browser 104 has terminated. The session identifier routine 108 may be or include a service worker, for example, configured according to the guidelines set forth in Service Workers 1, W3C Working Draft from the World Wide Web Consortium (W3C).

The session identifier routine 108 is associated with a session vault persistence 115. The session vault persistence 115 is a storage location at the data storage 110 of the user computing device 102. The session identifier routine 108 may use the session vault persistence 115 to store session identifier transformation data 118 that is used by the session identifier routine 108 to transform a client session identifier 124 to a server session identifier 126, as described herein.

The session vault persistence 115 may be positioned at a volatile or non-volatile storage device. In some examples, the session vault persistence 115 is accessible by the session identifier routine 108 and not accessible by other components executing at the user computing device 102, such as the web browser 104, the web application 106, etc. For example, the OS 116 or other suitable component of the user computing device 102 may be programmed to permit the session identifier routine 108 to access the session vault persistence 115, but may block other components from accessing the session vault persistence 115.

FIG. 1 also shows several example messages that illustrate the operation of the session identifier routine 108. A response message 128 is generated by the server 112 and includes the server session identifier 126 at a session identifier field. In some examples where the response message 128 is arranged according to the HTTP protocol, the session identifier field of the response message 128 is or includes the set-cookie HTTP response header of the response message 128.

The response message 128 is intercepted by session identifier routine 108, which transforms the server session identifier 126 to the client session identifier 124. The session identifier routine 108 removes the server session identifier 126 from the session identifier field of the response message 128 and writes the client session identifier 124 to the session identifier field of the response message 128. For example, if the response message 128 included the server session identifier 126 at the set-cookie HTTP response header, the session identifier routine 108 deletes the server session identifier 126 from the set-cookie HTTP response header and writes the client session identifier 124 to the set-cookie HTTP response header. The response message 128 with the client session identifier 124 is provided to the web application 106, for example, via the web browser 104. The web browser 104, or other application layer object, may write the client session identifier 124 to the cookie jar 114 for use in subsequent requests from the web application 106.

FIG. 1 also shows a request message 120. The request message 120 may be generated by the web application 106 or, in some examples, is a cross-origin request that originated outside the web application 106. For example, the web browser 104 may load a web page or other web content that originates a cross-origin request. In the example of FIG. 1, the request message 120 is to be part of the session associated with the session identifiers 124, 126. The web browser 104 finds the client session identifier 124 at the cookie jar 114 and adds the client session identifier 124 to the request message 120 at a session identifier field of the request message 120. In some examples where the request message 120 conforms to the HTTP syntax, the client session identifier 124 is included at a cookie HTTP request header. The web application 106 and/or web browser 104 sends the request message 120 to the server 112.

In the example of FIG. 1, the request message 120 is within the scope of the session identifier routine 108 and, therefore, is intercepted by the session identifier routine 108 before being passed to the server 112. The session identifier routine 108 transforms the client session identifier 124 to the server session identifier 126 using the session identifier transformation data 118 from the session vault persistence 115. The session identifier routine 108 then writes the server session identifier 126 to the session identifier field of the request message 120 and causes the request message 120 (with the server session identifier 126) to be sent to the server 112.

In some examples, the session identifier routine 108 adds the server session identifier 126 to the request message 120 only if the request message 120 complies with a session vault policy. The session vault policy may be set when the session identifier routine 108 is registered. For example, the web application 106 and/or web browser 104 may obtain and/or create a session vault policy file describing request messages that will be modified to include the server session identifier 126 and forwarded to the server 112. Any suitable policy may be used.

In some examples, the session vault policy permits the session identifier routine 108 to process inner-application request messages only. Inner-application request messages are request messages that originate from the web application 106 itself. The session identifier routine 108 may not add the server session identifier 126 to other request messages (e.g., cross-origin request messages). In other examples, the session vault policy permits the session identifier routine 108 to add the server session identifier 126 to some cross-origin requests. For example, the session vault policy may include white list data describing a set of one or more authorized locations. The session identifier routine 108 may add the server session identifier 126 to cross-origin requests originating from authorized locations described by the white list data. Example Java Script Object Notation (JSON) code implementing a session vault policy is provided below:

```
 1 {
 2 // General entry points
 3 "https://www.sap.com" : "*",
 4 "https://www.sap.com/info" : "*",
 5
 6 // Origin-bound interaction points
 7 "https://www.sap.com/signin" : [
 8
 9     // All request from identity-as-a-service.com
10     "https://identity-as-a-service.com/*",
11
12     // Oauth credential handover from authsv.com
13     "https://authsv.com/oauth.php"
14 ]
15 }
```

In this example session vault policy, the session identifier routine 108 is configured to provide the server session identifier 126 to cross-origin request messages originating from the general entry points indicated. Cross-origin request messages from an indicated identity-as-a-service and authentication service provider are also permitted if received through the indicated origin-bound interaction points.

The session vault policy may be set at the time that the session identifier routine 108 is registered. Also, in some examples, the session identifier routine 108 includes a default session vault policy that is implemented if no session vault policy is indicated. In some examples, the default session vault policy provides the server session identifier 126 only to inner-application requests.

Figure 2:
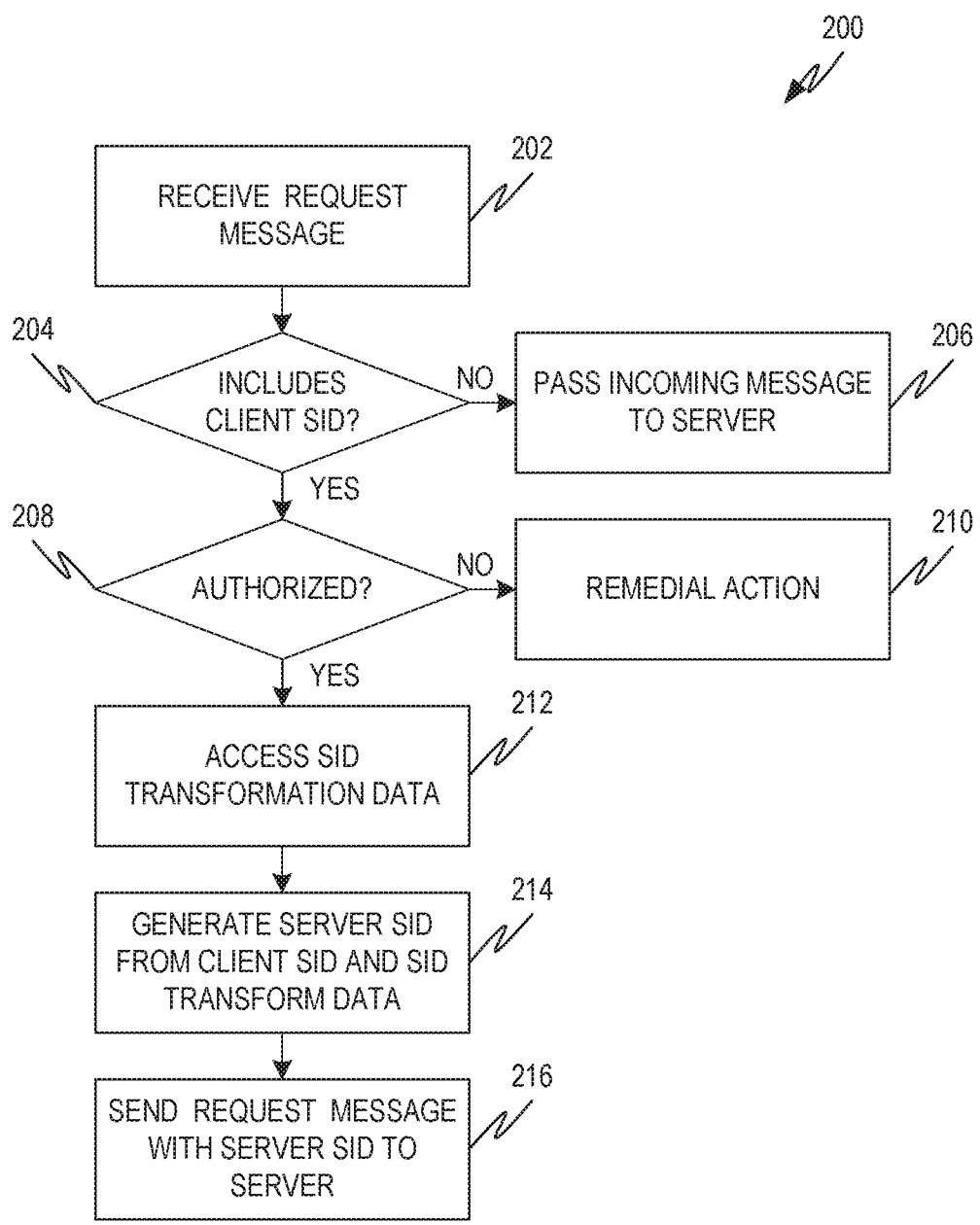
FIG. 2 is a flowchart showing one example of a process flow that may be executed by the session identifier routine of FIG. 1 to process request messages.

FIG. 2 is a flowchart showing one example of a process flow 200 that may be executed by the session identifier routine 108 of FIG. 1 to process request messages. At operation 202, the session identifier routine 108 receives a request message. The request message may originate from the web application 106 or may be a cross-origin request message originating from an outside source. In some examples, the web browser 104 routes the request message to the session identifier routine 108, for example, because the request message may be within the scope of the session identifier routine 108.

At operation 204, the session identifier routine 108 determines if the request message includes a client session identifier 124 at a session identifier field. If the request message lacks a client session identifier 124, then the session identifier routine 108 initiates sending the request message to the server 112 at operation 206. For example, if the request message lacks a client session identifier 124, it may not be associated with a session and, therefore, may not need to include the server session identifier 126.

Figure 3:
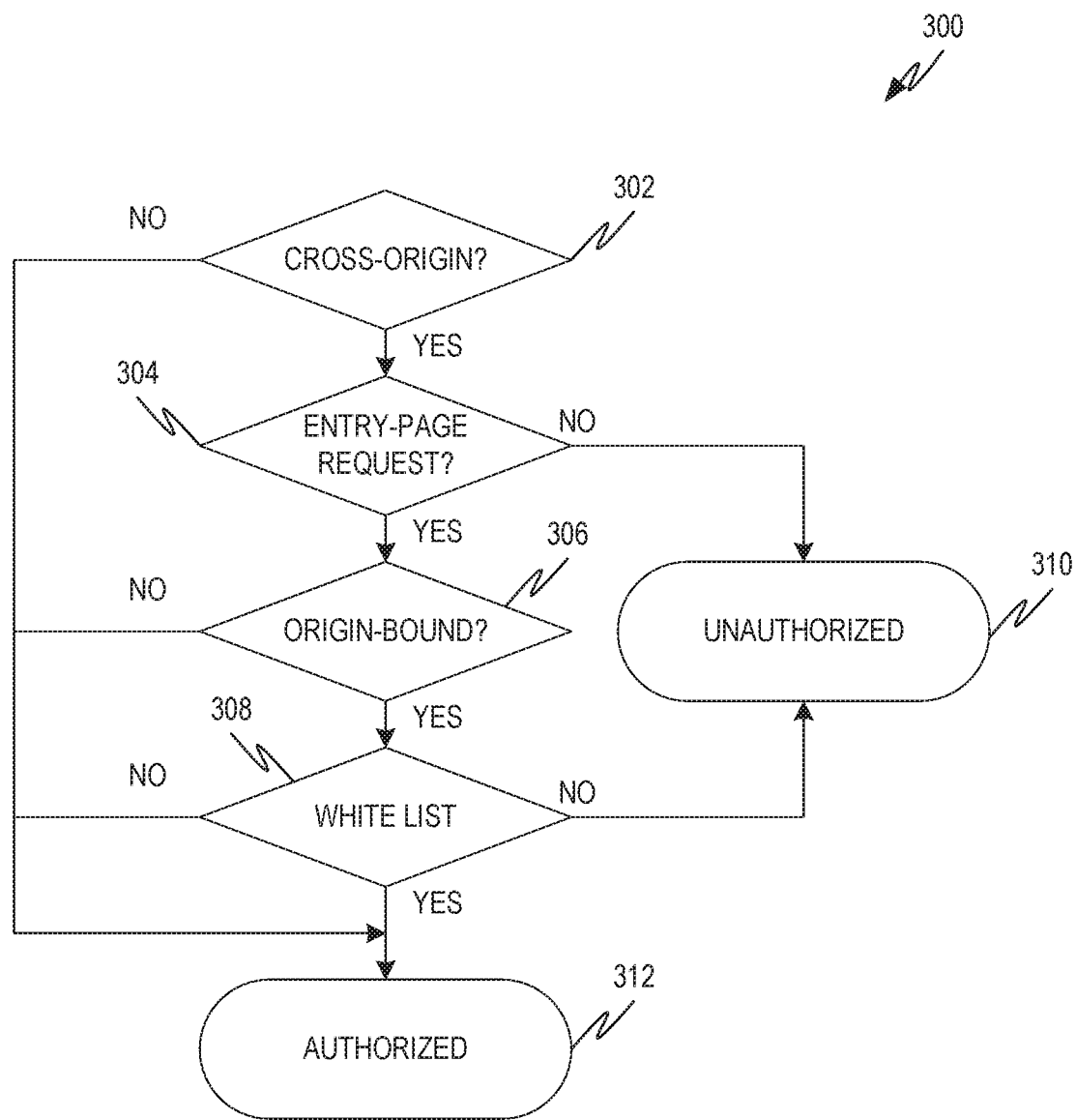
FIG. 3 is a flowchart showing one example of a process flow that may be executed by the session identifier routine of FIG. 1 to determine whether a request message including the client session identifier is authorized to be sent to the server with the server session identifier.
Figure 4:
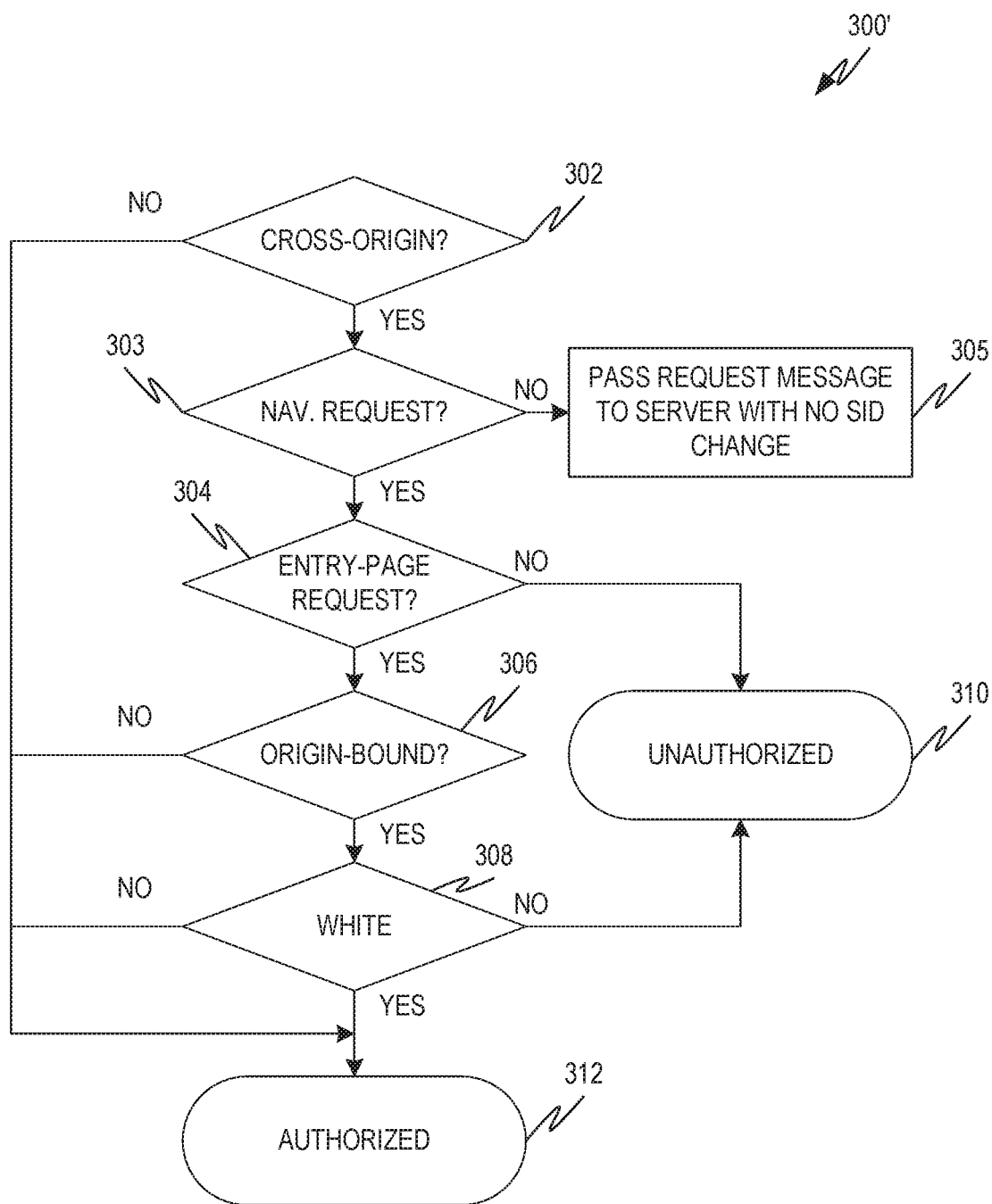
FIG. 4 is a flowchart showing another example of a process flow that may be executed by the session identifier routine of FIG. 1 to determine whether a request message including the client session identifier is authorized to be sent to the server with the server session identifier.

If the request message includes a client session identifier 124, the session identifier routine 108 determines, at operation 208, if the request message is authorized to be sent to the server 112 with the server session identifier 126. For example, the session identifier routine 108 applies a session vault policy to determine if the request message is authorized to be sent to the server 112 with the server session identifier 126. In some examples, the session identifier routine 108 applies a policy such that only inner-application request messages are authorized to include the server session identifier 126 (e.g., cross-origin request messages are unauthorized). In some examples, the session identifier routine 108 applies a policy such that some cross-origin request messages are authorized, for example, if the origin is described by white list data. FIGS. 3 and 4 show applications of example session vault policies that may be implemented by the session identifier routine 108 to determine whether a request message is authorized to be sent to the server 112 with the server session identifier 126.

If the request message is not authorized to be sent to the server 112 with the server session identifier 126, the session identifier routine 108 executes a remedial action at operation 210. The remedial action performed at operation 210 prevents the request message from reaching the server 112 with the server session identifier 126. In some examples, the remedial action includes initiating sending the request message to the server 112 with the client session identifier 124 (and without the server session identifier 126). Without the server session identifier 126, the server 112 will not process the request message as part of the intended session. Another example remedial action includes deleting the client session identifier 124 from the request message without adding the server session identifier 126 and initiating sending the request message to the server 112. In this case, the server 112 will process the request message as though it is not part of a session. Another example remedial action includes deleting the request message or otherwise preventing it from reaching the server 112.

If the request message is authorized to be sent to the server 112 with the server session identifier 126, the session identifier routine 108 accesses session identifier transformation data 118 at operation 212, for example, from the session vault persistence 115. At operation 214, the session identifier routine 108 transforms the client session identifier 124 using all or part of the session identifier transformation data 118 to generate the server session identifier 126. Any suitable type of transformation may be performed. For example, the session identifier transformation data 118 may include a cryptographic key. The session identifier routine 108 may transform the client session identifier 124 by performing a cryptographic operation on the client session identifier 124 with the cryptographic key to generate the server session identifier 126. Also, in some examples, the session identifier transformation data 118 includes one or more session identifier fragments. The session identifier routine 108 may combine the one or more session identifier fragments with the client session identifier 124 to generate the server session identifier 126, for example, as described herein with respect to FIG. 6.

Upon generating the server session identifier 126, the session identifier routine 108 may write the server session identifier 126 to the session identifier field of the request message, for example, replacing the server session identifier 126. The session identifier routine 108, at operation 216, sends the request message to the server with the server session identifier 126 at the session identifier field.

FIG. 3 is a flowchart showing one example of a process flow 300 that may be executed by the session identifier routine 108 of FIG. 1 to determine whether a request message including the client session identifier 124 is authorized to be sent to the server 112 with the server session identifier 126. The process flow 300 shows one example way that the session identifier routine 108 can execute the operation 208 of the process flow 200 according to an example session vault policy.

At operation 302, the session identifier routine 108 determines if the request message is a cross-origin request. If the request message is not a cross-origin request (e.g., the request message is an inner-application request), it may be authorized to be sent with the server session identifier 126 at operation 312.

If the request message is a cross-origin request, then, at operation 304, the session identifier routine 108 determines if the request message is an entry-page request. An entry-page request is a request that originated from a URL that is or is associated with the first page provided by the web root of the web application 106. If the request message is not an entry-page request, then it is directed to a non-entry URL that may be provided by malicious code that could steal the server session identifier 126. Accordingly, with the example session vault policy shown by the process flow 300, if the request message is a not an entry-page request, the request message is not authorized to be sent with the server session identifier 126 at operation 310.

If the request message is an entry-page request, the session identifier routine 108 determines, at operation 306, whether the message is origin-bound. An origin-bound request is a request message directed to an origin URL indicated by the session vault policy. If the request message is not origin-bound, the request message is authorized to include the server session identifier 126 at operation 312. If the request message is an origin-bound request, then the session identifier routine 108 determines, at operation 308, whether the origin is described by white list data, which may be part of the session vault policy. If the origin is described by the white list data, the request message is authorized to include the server session identifier 126 at operation 312. If the origin is not described by the white list data, the request message is not authorized to include the server session identifier 126 at operation 310.

FIG. 4 is a flowchart showing another example of a process flow 300' that may be executed by the session identifier routine 108 of FIG. 1 to determine whether a request message including the client session identifier is authorized to be sent with the server session identifier 126. The process flow 300' shows another example way that the session identifier routine 108 can execute the operation 208 of the process flow 200 according to another example session vault policy.

In the example of FIG. 4, if the session identifier routine 108 determines, at operation 302, that the request message is a cross-origin request, then it determines, at operation 303, whether the request message is a navigation request. A navigation request is generated, for example, when the web browser 104 wants to obtain from the server 112 an HTTP response that includes content that the web browser 104 will use to replace the content of a currently-rendered web document (e.g., rendered through the web application 106). If the request message is not a navigation message, the session identifier routine 108 passes the request message to the server 112 without changing the client session identifier 124 at operation 305. If the request message is a navigation request, then the session identifier routine 108 proceeds to operation 304, as described herein with respect to FIG. 3.

The operations 303 and 305 of the process flow 300' may be implemented by a session vault policy, as shown in FIG. 4. In some examples, such as when the session identifier routine 108 is or includes a service worker, the operations 303 and 305 may be effectively executed by excluding non-navigation request messages from the scope of the session identifier routine 108. In this way, the session identifier routine 108 may not intercept non-navigation request messages and those messages may be forwarded on to the server 112, similarly to operation 305.

Figure 5:
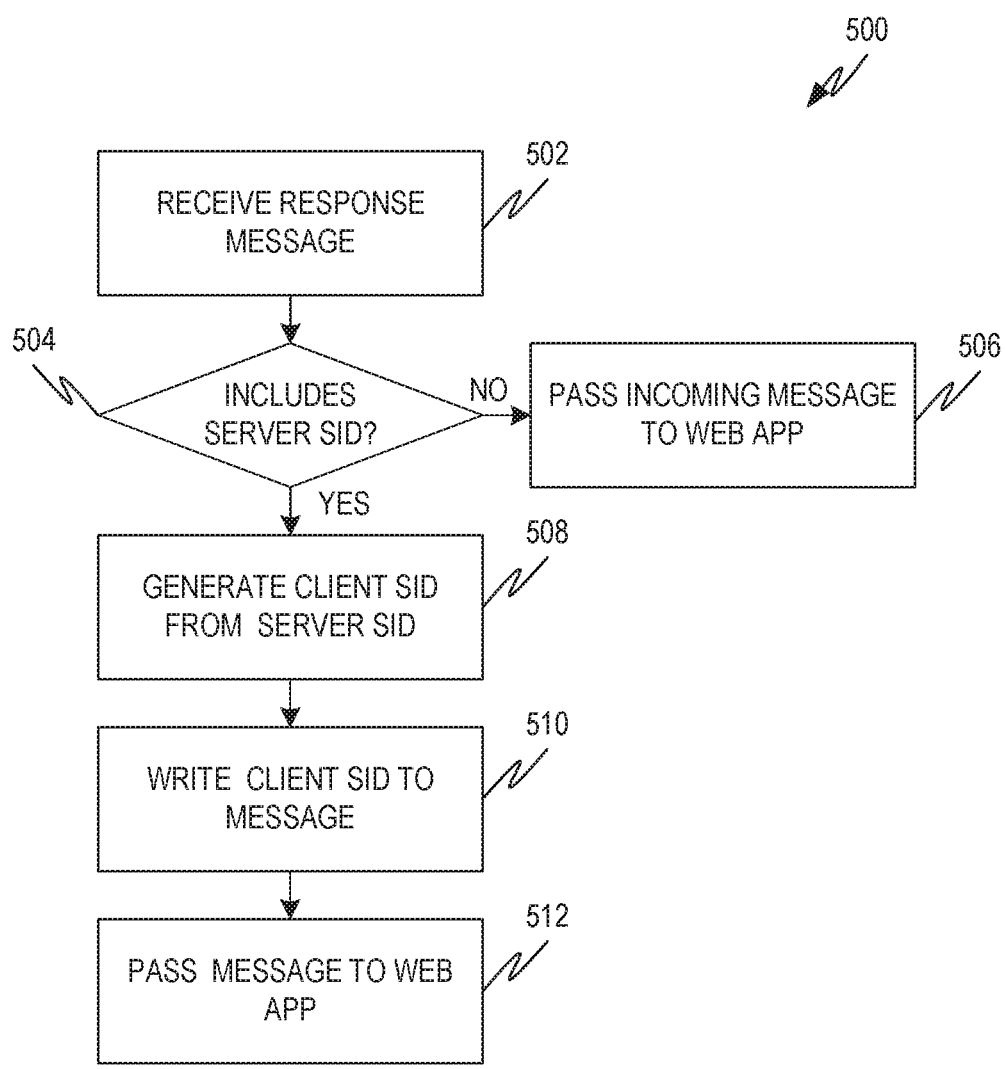
FIG. 5 is a flowchart showing one example of a process flow that may be executed by the session identifier routine of FIG. 1 to process a response message from the server.

FIG. 5 is a flowchart showing one example of a process flow 500 that may be executed by the session identifier routine 108 of FIG. 1 to process a response message from the server 112. At operation 502, the session identifier routine 108 receives a response message from the server 112. At operation 504, the session identifier routine 108 determines whether the response message includes a server session identifier 126 at a session identifier field. If no server session identifier 126 is present and/or if no session identifier field is present, then the session identifier routine 108 initiates sending the response message to the web application 106 (e.g., via the web browser 104) at operation 506.

If a server session identifier 126 is present, the session identifier routine 108, at operation 508, generates the client session identifier 124 corresponding to the server session identifier 126 from the server session identifier 126. For example, the session identifier routine 108 transforms the server session identifier 126. Any suitable transformation may be performed. In some examples, the transformation includes performing a cryptographic operation on the server session identifier 126, for example, utilizing a cryptographic key. The cryptographic key may be retrieved from and/or stored as part of the session identifier transformation data 118. In another example, the transformation includes dividing the server session identifier 126 into multiple session identifier fragments. One or more of the session identifier fragments may make up the client session identifier 124. One or more remainder session identifier fragments are stored as part of the session identifier transformation data 118 and used to recreate the server session identifier 126, as described herein.

At operation 510, the session identifier routine 108 writes the client session identifier 124 to the response message. The server session identifier 126 is removed. At operation 512, the session identifier routine 108 initiates sending of the response message, with the client session identifier 124, to the web application 106 (e.g., via the web browser 104). The web browser 104, for example, may receive the response message and process the response message by writing the client session identifier 124 to the cookie jar 114 for the web browser 104. From there, the web browser 104 may retrieve the client session identifier 124 from the cookie jar to include it with subsequent request messages sent to the server 112. The session identifier routine 108 may handle the subsequent request messages as described with respect to FIGS. 2-4.

Figure 6:
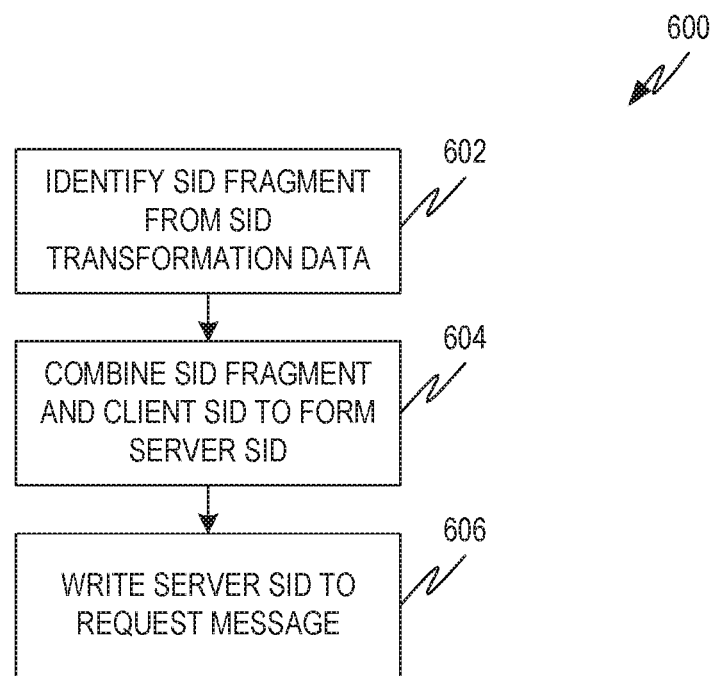
FIG. 6 is a flowchart showing one example of a process flow that may be executed by the session identifier routine to transform a client session identifier to a corresponding server session identifier.

FIG. 6 is a flowchart showing one example of a process flow 600 that may be executed by the session identifier routine 108 to transform a client session identifier 124 to a corresponding server session identifier 126. For example, the process flow 600 shows one example way that the session identifier routine 108 can execute the operation 214 of the process flow 200 described herein.

In the example of FIG. 6, the session identifier transformation data 118 is or includes session identifier fragment data that is combinable with the client session identifier 124 to generate the server session identifier 126. At operation 602, the session identifier routine 108 identifies the session identifier fragment data from the session identifier transformation data 118. At operation 604, the session identifier routine 108 combines the session identifier fragment data with the client session identifier 124 to form the server session identifier 126.

Different combinations are performed in different example arrangements. In some examples, the session identifier routine 108 concatenates the client session identifier 124 and session identifier fragment data. For example, the session identifier routine 108 may append the session identifier fragment data to the end of the client session identifier 124 or append the client session identifier 124 to the end of the session identifier fragment. In other examples, the session identifier fragment data is placed at a position in the middle of the client session identifier 124. In some examples, the position where the session identifier fragment data is to be placed is also indicated by the session identifier transformation data 118. Other combinations may also be used.

At operation 606, the session identifier routine 108 writes the generated server session identifier 126 to the request message at a session identifier field. In some examples in which the request message conforms to the HTTP syntax, the server session identifier 126 may be written to a cookie HTTP header.

Figure 7:
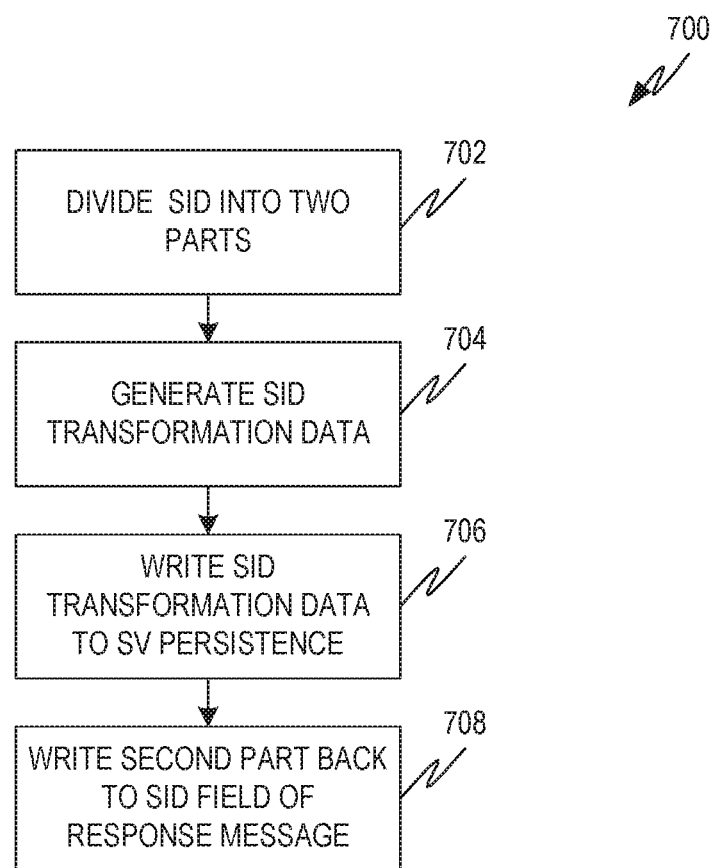
FIG. 7 is a flowchart showing one example of a process flow that may be executed by the session identifier routine to transform a server session identifier to a corresponding client session identifier.

FIG. 7 is a flowchart showing one example of a process flow 700 that may be executed by the session identifier routine 108 to transform a server session identifier 126 to a corresponding client session identifier 124. For example, the process flow 700 shows one example way that the session identifier routine 108 can execute the operation 508 of the process flow 500 described herein.

At operation 702, the session identifier routine 108 divides the server session identifier 126 into at least two session identifier fragments. In some examples, the session identifier routine 108 divides the session identifier 126 equally (e.g., in half). A portion of the session identifier fragments makes up the client session identifier 124. Another portion of the session identifier fragments is used, at operation 704, to generate session identifier transformation data 118. The session identifier transformation data 118 includes at least one of the session identifier fragments from the server session identifier 126. In some examples, the session identifier transformation data 118 also includes data describing how to combine the session identifier fragment or fragments with the client session identifier 124 to re-create the server session identifier 126, as described herein. In some examples, the session identifier transformation data 118 also includes data that identifies the client session identifier 124. This may allow the session identifier routine 108 to later identify the correct session identifier transformation data 118 for transforming the client session identifier 124 into the server session identifier 126.

At operation 706, the session identifier routine 108 writes the session identifier transformation data 118 to the session vault persistence 115. At operation 708, the session identifier routine 108 writes the client session identifier 124 to the response message at a session identifier field (e.g., a set-cookie HTTP header).

The session identifier routine 108 arrangements described herein may increase the security of the web application 106 and web browser 104 communications against various different attacks by malicious actors. For example, consider a session identifier theft attack. In a session identifier theft attack, malicious code is used to obtain the session identifier from the web browser's cookie jar 114. In the example described herein, such an attack would obtain the client session identifier 124. Because the server 112 does not recognize the client session identifier 124 to indicate a communication session, the attacker would not be able to use the client session identifier 124 to impersonate the web application 106.

Consider also a session fixation attack. A session fixation attack arises when the server 112 does not assign a session identifier. For example, the server 112 may use a session identifier provided by the web browser 104 or web application 106 (e.g., along with authentication data). In a session fixation attack, the attacker tricks the web application 106 into providing the server 112 with a session identifier provided by the attacker. If the web application 106 fails to realize that the session identifier was provided by the attacker instead of the server, it will begin to use the attacker-provided session identifier. If the web application 106 subsequently authenticates to the server 112 using the attacker-provided session identifier, then the attacker is able to impersonate the web application 106 to exploit the authenticated session.

In a session identifier routine 108 arrangement described herein, the attacker-provided session identifier does not traverse the session identifier routine 108 before being provided to the web application 106. If the web application 106 subsequently uses the attacker-provided session identifier to begin or continue a session with the server 112, request messages including the attacker-provided session identifier are intercepted by the session identifier routine 108 and transformed into a server session identifier 126, as described herein. Accordingly, the server 112 associates the session with the transformation of the attacker-provided session identifier. In this way, when the attacker attempts to impersonate the web application 106 using the attacker-generated session identifier, the server 112 does not recognize the attacker-generated session identifier.

Consider also cross-site request forgery (CSRF) attacks. A CSRF attack occurs when a user of the web application 106 navigates the web browser 104 to a web document that is under the control of the attacker. The web document, usually without the consent of the user, creates a cross-origin request message directed to the server 112. The cross-origin request message uses the session identifier provided by the web browser 104 to request that the server 112 take an unauthorized action under the victim/user's identity.

In a session identifier routine 108 arrangement, as described herein, the session identifier routine 108 may be programmed with a session vault policy that declines to add the server session identifier 126 for malicious cross-origin request messages. For example, the session identifier routine 108 may be implemented with a session vault policy that declines to add the server session identifier 126 to any cross-origin request messages. In other examples, the session identifier routine 108 may be implemented with a session vault policy that declines to add the server session identifier 126 to cross-origin request messages unless they are either non-origin bound or are from origins described by whitelist data, which may describe safe, non-attacker origins.

Consider also ClickJacking and reflected XSS attacks. In a ClickJacking attack, the attacker loads an authenticated web page that is modified to include an iframe or other page portion rendered by the web browser 104. The iframe or other page portion includes embedded UI controls associated with an attacker-owned web page. The user is tricked into interacting with the attacker's UI controls, which generate cross-origin request messages to the server. Ordinarily, the web browser 104 would add the session identifier to these malicious request messages. In a reflected XSS attack, the attacker causes the web browser 104 to execute JavaScript contained in the iframe or other page portion to generate request messages to the server 112. Again, the web browser 104 is tricked into adding the session identifier to these malicious request messages.

In a session identifier routine 108 arrangement, as described herein, the session identifier routine 108 may be programmed with a session vault policy that prevents the session identifier routine 108 from adding the server session identifier 126 to request messages that originate from non-entry pages. Because the iframe or other web portion used to implement a ClickJacking or reflected XSS attack is a non-entry page, the session identifier routine 108 may be programmed to deny the server session identifier 126 to malicious request messages that result from attacks of these types. Accordingly, the server 112 may not associate the malicious request messages with the web application's session.

Consider also a privacy attack. According to a privacy attack, the attacker measures the timing of authenticated and non-authenticated communication traffic and compares the corresponding values. From this, the attacker may be able to back out and steal the session identifier or identifiers used for authenticated sessions. In a session identifier routine arrangement, as described herein, the attacker would only be able to obtain the client session identifier 124, which is not useful for impersonating the web application 106.

In some examples, it is desirable to implement the session identifier routine 108 with components that do not have authorization to modify the session identifier fields of request and/or response messages. For example, some service worker implementations are not configured with authorization to modify cookie HTTP headers or set-cookie HTTP headers. If the session identifier routine 108 is not authorized to modify message session identifier fields, then it may not be able to replace server session identifiers with client session identifiers and visa versa, as described herein.

Figure 8:
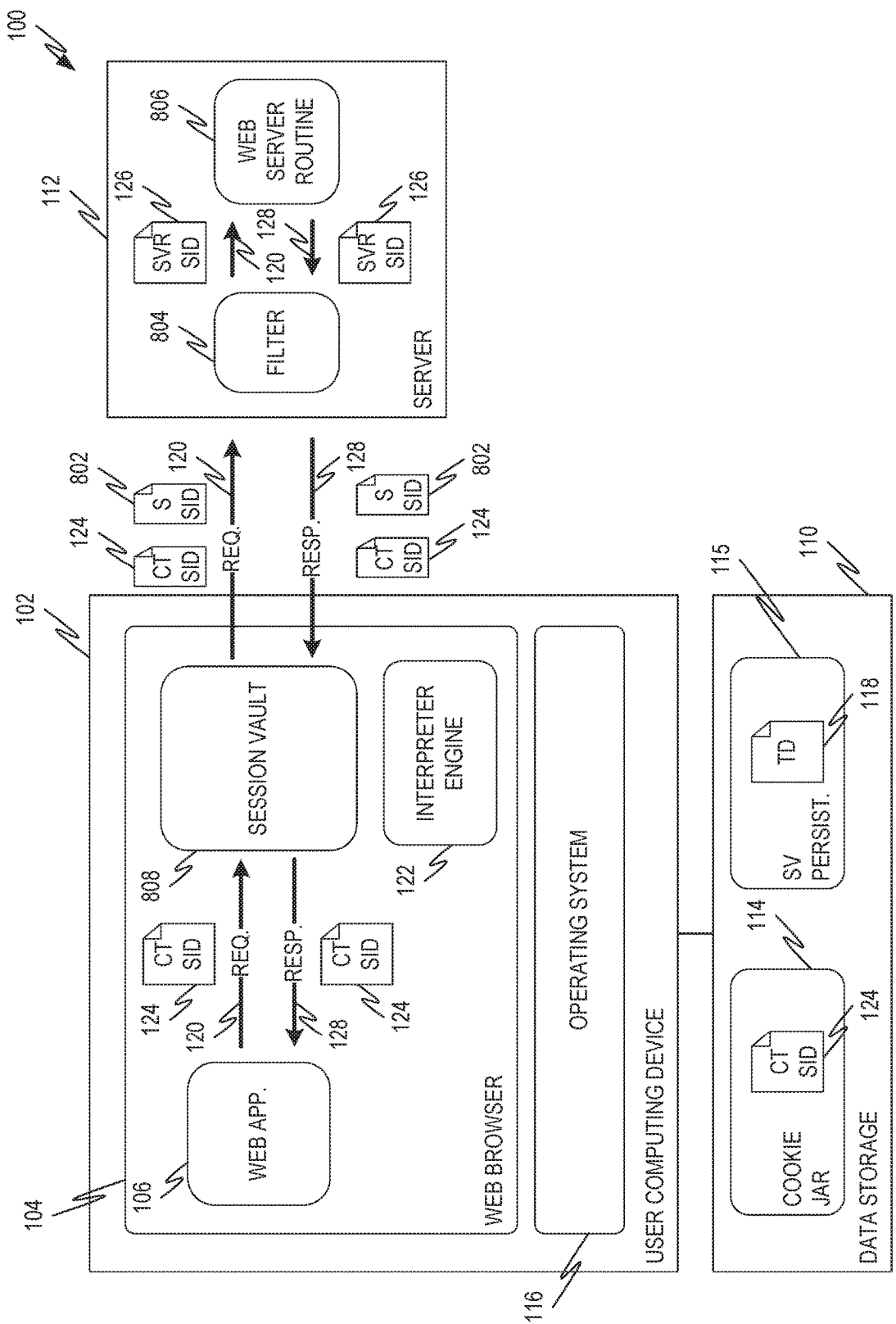
FIG. 8 is diagram showing an alternative example of the environment including a session identifier routine that is configured to implement web application security with supplemental session identifier data.

FIG. 8 is diagram showing an alternative example of the environment 100 including a session identifier routine 808 that is configured to implement web application security with supplemental session identifier data 802. In the example of FIG. 8, the session identifier routine 808 may not modify the session identifier fields of requests and messages but may, instead, supplement the client session identifier 124 with supplemental session identifier data 802.

The supplemental session identifier data 802 is included at a second field of the messages that is modifiable by the session identifier routine 808. For example, a service worker-implemented session identifier routine 808 may not be configured with authorization to modify cookie HTTP headers or set-cookie HTTP headers. Instead, the session identifier routine 808 may be configured with authorization to modify other HTTP headers, such as X-Set-Auth and X-Auth HTTP headers. The supplemental session identifier data 802 may be stored at the other HTTP headers. A filter 804 executed at the server 112 converts between the server session identifier 126 and the combination of the client session identifier 124 and the supplemental session identifier data 802.

Consider a response message 128 generated by the web server routine 806. The response message 128 includes the server session identifier 126 at the session identifier field. For example, the server session identifier 126 may be at the set-cookie HTTP header of the response message 128. The filter 804, which may be an HTTP filter, is positioned at the server 112 to intercept the response message 128. The filter 804 transforms the server session identifier 126 to determine the client session identifier 124 and the supplemental session identifier data 802. The filter 804 removes the server session identifier 126 from the response message 128. The filter 804 adds the client session identifier 124 to the session identifier field of the response message 128 (e.g., the set-cookie HTTP header) and adds the supplemental session identifier data 802 to a second field of the response (e.g., the X-Set-Auth HTTP header).

The response message 128 including the client session identifier 124 and the supplemental session identifier data 802 is then sent to the user computing device 102 (e.g., directed to the web browser 104 and/or web application 106). The session identifier routine 808, similar to the session identifier routine 108, has a scope that, in this example, includes the response message 128. Accordingly, the session identifier routine 808 intercepts the response message 128 before it is provided to the web application 106 or web browser 104. The session identifier routine 808 strips the supplemental session identifier data 802 from the response message 128 and provides the response message 128, including the client session identifier 124, to the web browser 104 and web application 106. The web browser 104 and web application 106 may process the response message 128, for example, by storing the client session identifier 124 at the browser cookie jar 114.

Consider an example request message 120. The request message 120 includes the client session identifier 124 at the session identifier field of the request message 120. The request message 120 is intercepted by the session identifier routine 808. The session identifier routine 808 generates and/or identifies supplemental session identifier data 802 that is associated with the client session identifier 124. In some examples, the supplemental session identifier data 802 is all or part of the session identifier transformation data 118 stored at the session vault persistence 115. The session identifier routine 808 writes the supplemental session identifier data 802 to a second field of the request message 120 (e.g., the x-Auth HTTP header). The session identifier routine 808 then causes the request message 120 to be sent to the server 112.

At the server 112, the filter 804 intercepts the incoming request message 120. The filter 804 transforms client session identifier 124 into the server session identifier 126 using the supplemental session identifier data 802. The filter 804 may transform the client session identifier 124 into the server session identifier 126 in a manner similar to the way that the session identifier routine 108 described herein transforms the client session identifier 124 into the server session identifier 126. For example, the supplemental session identifier data 802 may include one or more session identifier fragments that are combined with the client session identifier 124 to generate the server session identifier 126. Also, in some examples, the supplemental session identifier data 802 includes a cryptographic key that is used to perform a cryptographic operation on the client session identifier 124 to generate the server session identifier 126. The filter 804 writes the server session identifier 126 to the session identifier field of the request message 120 and provides the request message 120 including the server session identifier 126 to the web server routine 806.

Figure 9:
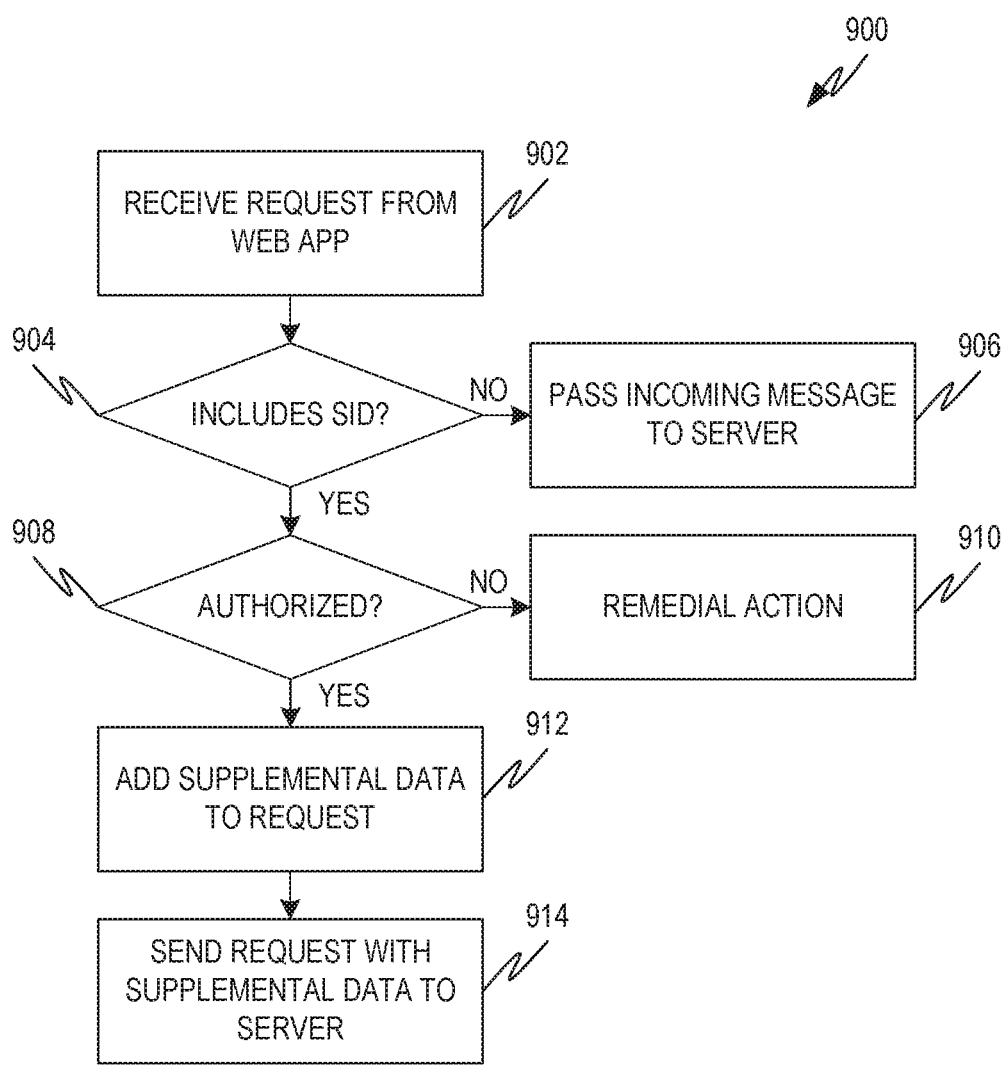
FIG. 9 is a flowchart showing one example of a process flow that may be executed by the session identifier routine of FIG. 8 to process request messages using supplemental session identifier data.

FIG. 9 is a flowchart showing one example of a process flow 900 that may be executed by the session identifier routine 808 to process request messages. At operation 902, the session identifier routine 808 receives a request message. The request message may originate from the web application 106 or may be a cross-origin request message originating from an outside source. At operation 904, the session identifier routine 808 determines if the request message includes a client session identifier 124 at a session identifier field. If the request message lacks a client session identifier 124, then the session identifier routine 808 initiates sending the request message to the server 112 at operation 906. For example, if the request message lacks a client session identifier 124, it may not be associated with a session and, therefore, may not need to include a server session identifier 126.

If the request message includes a client session identifier 124, the session identifier routine 808 determines, at operation 908, if the request message is authorized to be sent to the server 112 with the supplemental session identifier data 802. For example, the session identifier routine 808 applies a session vault policy to determine if the request message is authorized to be sent to the server 112 with the supplemental session identifier data 802. In some examples, the session identifier routine 808 applies a session vault policy similar to the way that the session identifier routine 108 applies a session vault policy. For example, process flows of FIGS. 3 and 4 show example session vault policies that may be implemented by the session identifier routine 808 to determine whether a request message is authorized to be sent to the server 112 with supplemental session identifier data 802.

If the request message is not authorized to be sent to the server 112 with the supplemental session identifier data 802, the session identifier routine 808 executes a remedial action at operation 910. The remedial action performed at operation 910 prevents the request message from reaching the server 112 (including the filter 804) with the supplemental session identifier data 802. In some examples, the remedial action includes initiating sending the request message to the server 112 with the client session identifier 124 and without adding the supplemental session identifier data 802. Without the supplemental session identifier data 802, the filter 804 will not transform the client session identifier 124 to the server session identifier 126 and the web server routine 806 will not process the request message as part of the intended session. Another example remedial action includes deleting the client session identifier 124 from the request message without adding the server session identifier 126 and initiating sending the request message to the server 112. In this case, the filter 804 and web server routine 806 will process the request as though it is not part of a session. Another example remedial action includes deleting the request message or otherwise preventing it from reaching the server 112.

If the request message is authorized to be sent to the server 112 with the supplemental session identifier data 802, the session identifier routine 808 accesses session identifier transformation data 118, for example, from the session vault persistence 115. As described herein, the session identifier transformation data 118 may include the supplemental session identifier data 802. At operation 912, the session identifier routine 808 adds the supplemental session identifier data 802 to the request message. For example, the session identifier routine 808 adds the supplemental session identifier data 802 at an X-Auth HTTP header. At operation 914, the session identifier routine 808 causes the request message to be sent to the server 112. For example, as sent to the server 112, the request message includes the client session identifier 124 and the supplemental session identifier data 802. At the server 112, the filter 804 transforms the client session identifier 124 and supplemental session identifier data 802 to the server session identifier 126 and adds the server session identifier 126 to the session identifier field of the request message, as described herein.

Figure 10:
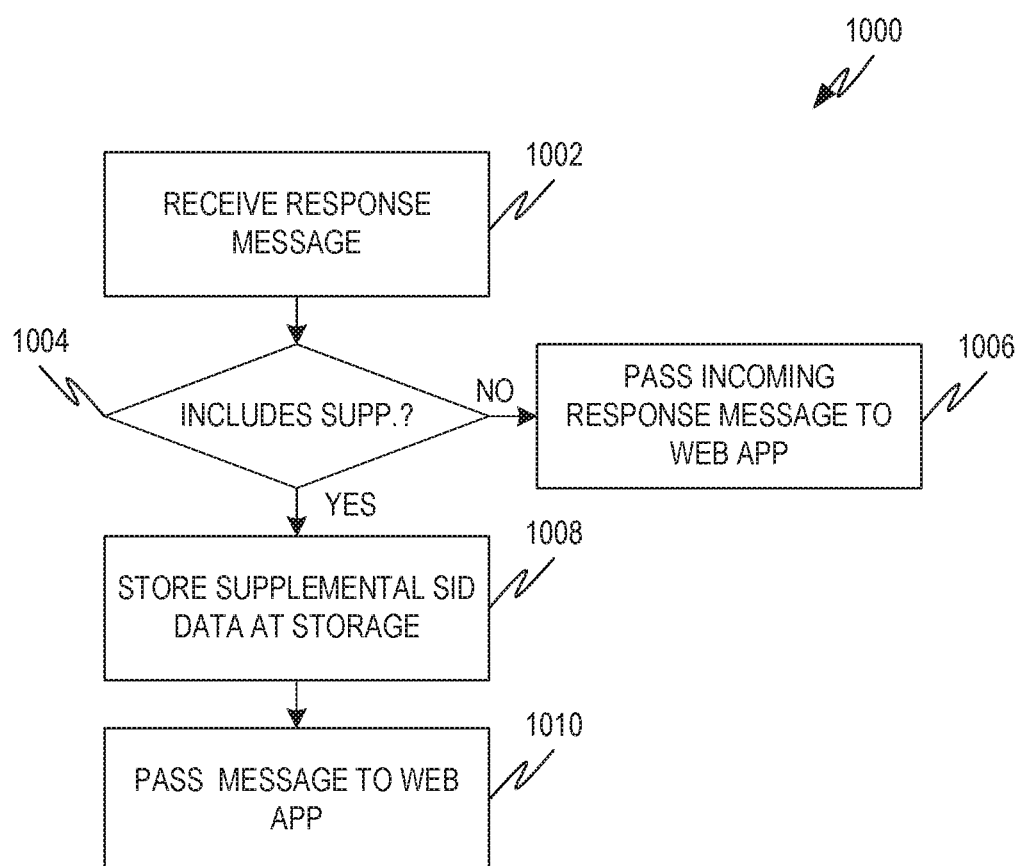
FIG. 10 is a flowchart showing one example of a process flow that may be executed by the session identifier routine of FIG. 8 to process a response message from the server using supplemental session identifier data.

FIG. 10 is a flowchart showing one example of a process flow 1000 that may be executed by the session identifier routine 808 of FIG. 8 to process a response message from the server 112. At operation 1002, the session identifier routine 808 receives the incoming response message. At operation 1004, the session identifier routine 808 determines whether the response message includes the client session identifier 124 at the session identifier field and the supplemental session identifier data 802 at a second field. If not, it may be an indication that the response message is not part of a previous session. The session identifier routine 808 may send the response message to the web browser 104 and/or web application 106 at operation 1006.

If the response message includes the client session identifier 124 at the session identifier field and the supplemental session identifier data 802 at a second field, it may indicate that the response message is part of (or is initiating) a session. For example, the response message from the server 112 may have been generated by the web server routine 806 to include the server session identifier 126. Before the message was sent by the server 112, the filter 804 transformed the server session identifier 126 to the client session identifier 124 and supplemental session identifier data 802. The filter 804 removed the server session identifier 126 from the response message session identifier field and wrote the client session identifier 124 to the session identifier field. The filter 804 also wrote the supplemental session identifier data 802 to a second field of the response.

If the response message includes the client session identifier 124 at the session identifier field and the supplemental session identifier data 802 at a second field, the session identifier routine 808 may remove the supplemental session identifier data 802 from the response message and, at operation 1008, store the supplemental session identifier data at the session vault persistence 115 (e.g., as all or part of transformation data 118). At operation 1010, the session identifier routine 808 passes the response message including the client session identifier 124 at the session identifier field to the web application 106 and/or web browser 104.

Figure 11:
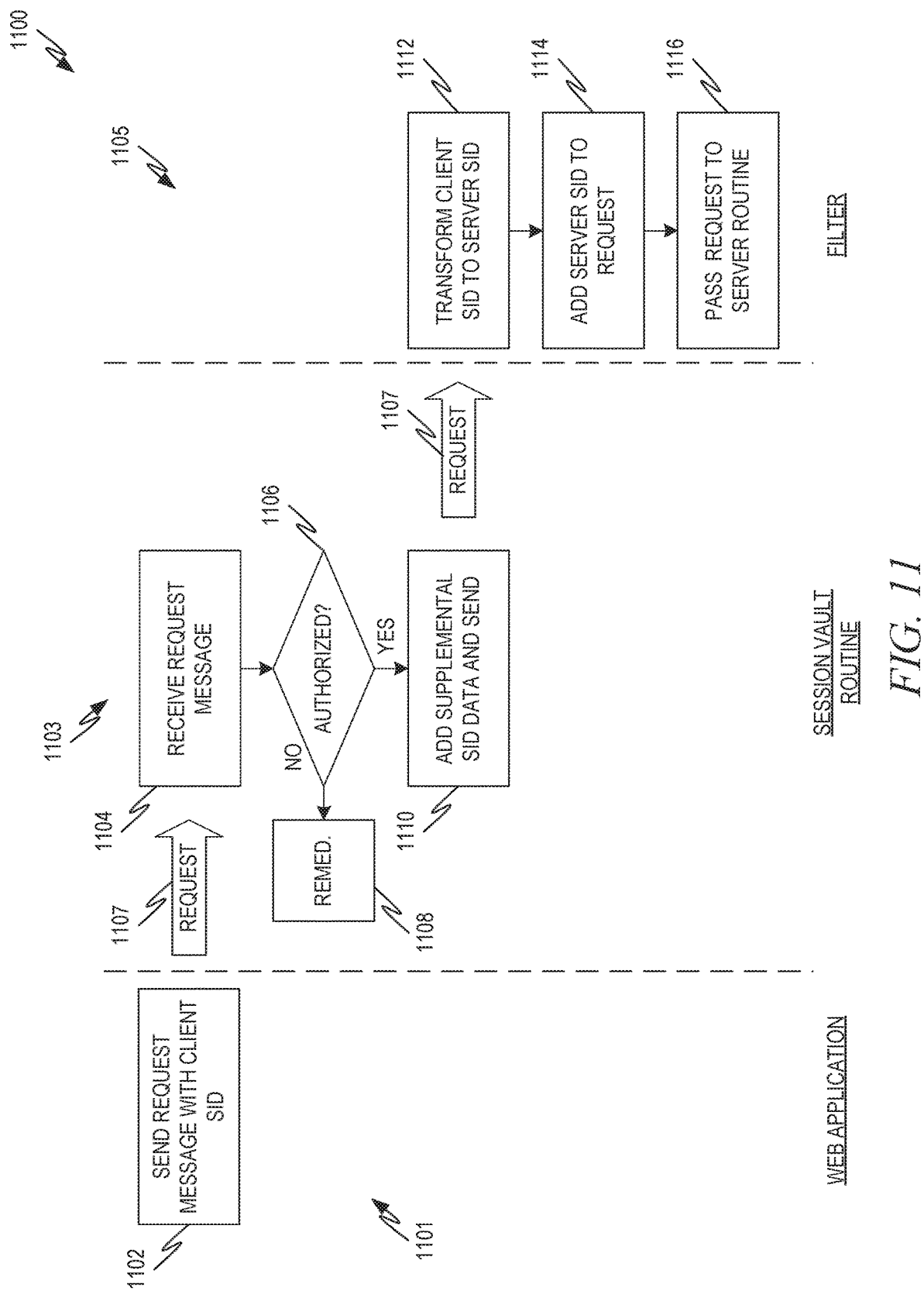
FIG. 11 is a flowchart showing one example of a process flow that may be executed in the example environment of FIG. 8 to process a request message.

FIG. 11 is a flowchart showing one example of a process flow 1100 that may be executed in the example environment 100 of FIG. 8 to process a request message. The process flow 1100 includes three columns: 1101, 1103, 1105. Column 1101 includes operations performed by the web application 106 and/or other client-side components. Column 1103 includes operations performed by the session identifier routine 808. Column 1105 includes operations performed by the filter 804.

At operation 1102, the web application 106 sends a request message 1107 with the client session identifier 124. For example, the web application 106 may send the request message 1107 through the web browser 104, which may retrieve the client session identifier 124 and add it to the request message 1107 at a session identifier field.

The session identifier routine 808 receives the request message 1107 at operation 1104. At operation 1106, the session identifier routine 808 determines whether the request message 1107 is authorized to be provided to the server 112 with the supplemental session identifier data 802, for example, according to a session vault policy, as described herein. If the request message 1107 is not authorized to be provided to the server 112 with the supplemental session identifier data 802, then the session identifier routine 808 executes a remedial action at operation 1108. If the request message 1107 is authorized to be provided to the server 112 with the supplemental session identifier data 802, then the session identifier routine 808 adds supplemental session identifier data 802 to the request message 1107 and sends the request message 1107 to the server 112 at operation 1110.

At the server 112, the request message 1107 is intercepted by the filter 804. At operation 1112, the filter 804 transforms the client session identifier 124 to the server session identifier 126, using the supplemental session identifier data 802. In some examples, the filter 804 transforms the client session identifier 124 in a manner similar to the way that the session identifier routine 808 transforms the client session identifier 124. For example, the supplemental session identifier data 802 may include a cryptographic key. The filter 804 may transform the client session identifier 124 by performing a cryptographic operation on the client session identifier 124 with the cryptographic key to generate the server session identifier 126. Also, in some examples, the supplemental session identifier data 802 includes one or more session identifier fragments. The filter 804 may combine the one or more session identifier fragments with the client session identifier 124 to generate the server session identifier 126, for example, as described herein with respect to FIG. 6.

At operation 1114, the filter 804 adds the server session identifier 126 to the request message 1107 at the session identifier field. For example, the server session identifier 126 may replace the client session identifier 124 at the session identifier field. At operation 1116, the filter 804 causes the request message 1107, with the server session identifier 126 at the session identifier field, to the web server routine 806.

Figure 12:
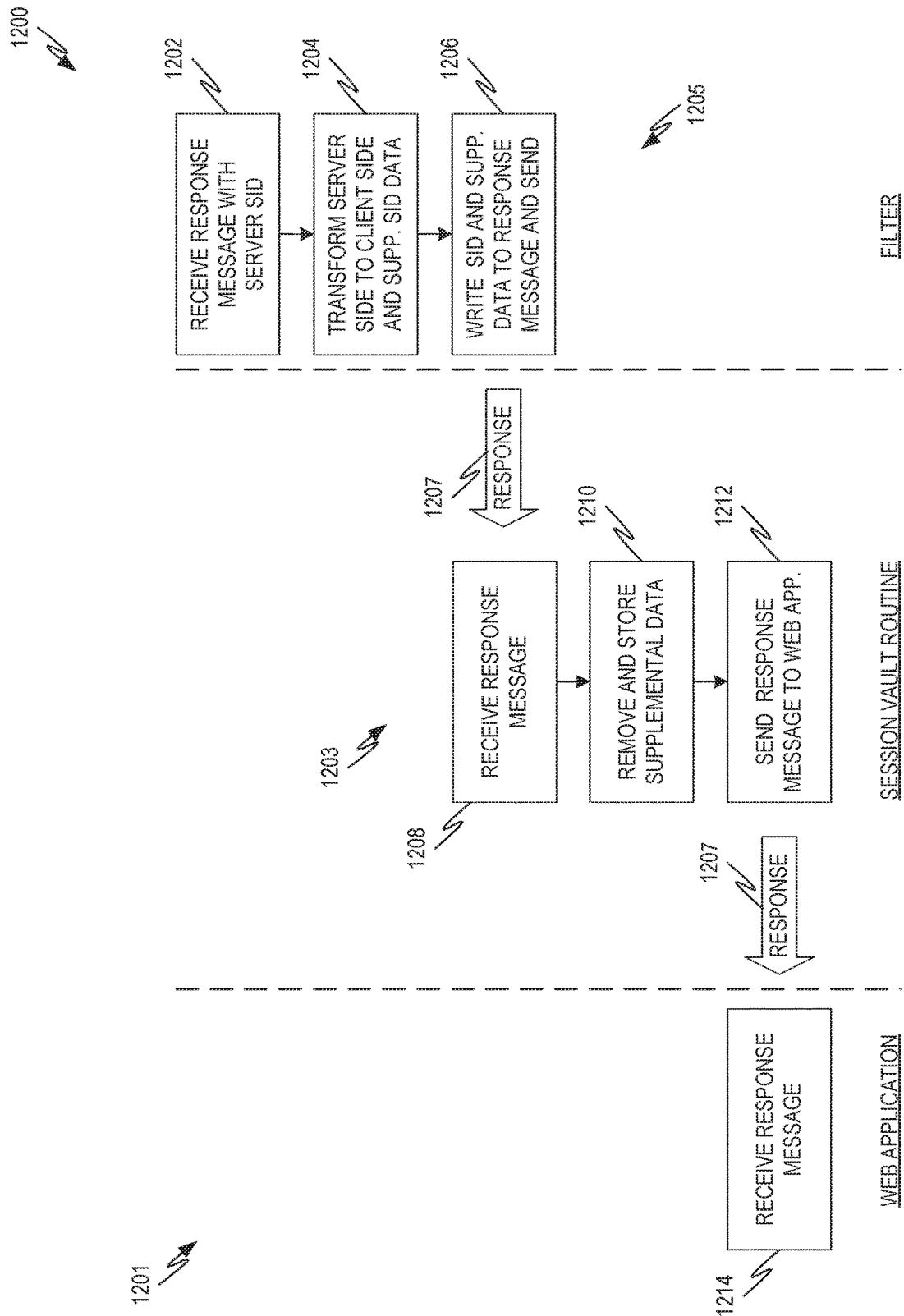
FIG. 12 is a flowchart showing one example of a process flow that may be executed in the example environment of FIG. 8 to process a request message.

FIG. 12 is a flowchart showing one example of a process flow 1200 that may be executed in the example environment of FIG. 8 to process a request message. The process flow 1200 includes three columns: 1201, 1203, 1205. Column 1201 includes operations performed by the web application 106 and/or other client-side components. Column 1203 includes operations performed by the session identifier routine 808. Column 1205 includes operations performed by the filter 804.

At operation 1202, the filter 804 receives a response message 1207 from the web server routine 806. The response message 1207 includes the server session identifier 126 at the session identifier field. The filter 804, at operation 1204, transforms the server session identifier 126 to generate the client session identifier 124 and supplemental session identifier data 802. In some examples, the filter 804 transforms the server session identifier 126 in a manner similar to how the session identifier routine 108 of FIG. 1 transforms the server session identifier 126 to generate the client session identifier 124. In some examples, the filter 804 performs a cryptographic operation, such as encryption or decryption, on the server session identifier 126 using a cryptographic key. The result of the cryptographic operation may be all or part of the client session identifier 124 and the cryptographic key may be all or part of the supplemental session identifier data 802. Also, in some examples, the filter 804 breaks the server session identifier 126 into two or more session identifier fragments. A set of one or more of the session identifier fragments make up the client session identifier 124 and a set of one or more of the remaining session identifier fragments make up the supplemental session identifier data 802. For example, the filter 804 may break the server session identifier 126 into one or more session identifier fragments as described herein with respect to FIG. 7.

At operation 1206, the filter writes the client session identifier 124 to the session identifier field of the response message 1207 (replacing the server session identifier 126) and writes the supplemental session identifier data 802 to the second field of the response message (e.g., the X-Set-Auth HTTP header). The filter 804 then sends the response message 1207 to the user computing device 102 where it is intercepted by the session identifier routine 808.

The session identifier routine 808, at operation 1208, receives the response message 1207. At operation 1210, the session identifier routine 808 removes the supplemental session identifier data 802 from the second field and stores it at the session vault persistence 115 (e.g., as part of transformation data 118). At operation 1212, the session identifier routine 808 sends the response message 1207 to the web application 106 and/or web browser 104. The web application 106 receives the response message 1207 at operation 1214.

The session identifier routine 808 described in FIG. 8 may also increase the security of the web application 106 and web browser 104 communications against various attacks. Consider again a session identifier theft attack. If an attacker is able to obtain the client session identifier 124, the attacker will not be able to participate in the corresponding session with the server 112 without also obtaining the supplemental session identifier data 802.

Also, consider again a session fixation attack. Even if the attacker does trick the web browser 104 or web application 106 into using an attacker-provided session identifier with the server 112, the session identifier routine 108 will supplement the attacker-provided session identifier with supplemental session identifier data 802 before sending it to the server. Also, the filter 804 will derive a new server session identifier different than the attacker-provided session identifier for use by the web server routine 806. Accordingly, if the attacker attempts to impersonate the web application 106 with the attacker-provided session identifier, the server 112 may not recognize the attacker-provided session identifier.

Consider again a CSRF attack. Similar to the session identifier routine 108, the session identifier routine 808 may be programmed with a session vault policy that declines to add the supplemental session identifier data 802 to malicious cross-origin request messages. For example, the session identifier routine 808 may be implemented with a session vault policy that declines to add the supplemental session identifier data 802 to any cross-origin request messages. In other examples, the session identifier routine 808 is implemented with a session vault policy that declines to add the supplemental session identifier data 802 to cross-origin request messages unless they are either non-origin bound or are from origins described by whitelist data, which may describe safe, non-attacker origins. If a cross-origin request message is not modified by the session identifier routine 808 to include the supplemental session identifier data 802, it may not be associated with the intended session at the server 112.

Consider again ClickJacking and reflected XSS attacks. Similar to the session identifier routine 108, the session identifier routine 808 may be programmed with a session vault policy that prevents the session identifier routine 808 from adding the supplemental session identifier data 802 to request messages that originate from non-entry pages. Because the iframe or other web portion used to implement a ClickJacking or reflected XSS attack is a non-entry page, the session identifier routine 808 may be programmed to deny the supplemental session identifier data 802 to malicious request messages that result from attacks of these types. If the non-entry request message is not modified by the session identifier routine 808 to include the supplemental session identifier data 802, it may not be associated with the intended session at the server 112.

Figure 13:
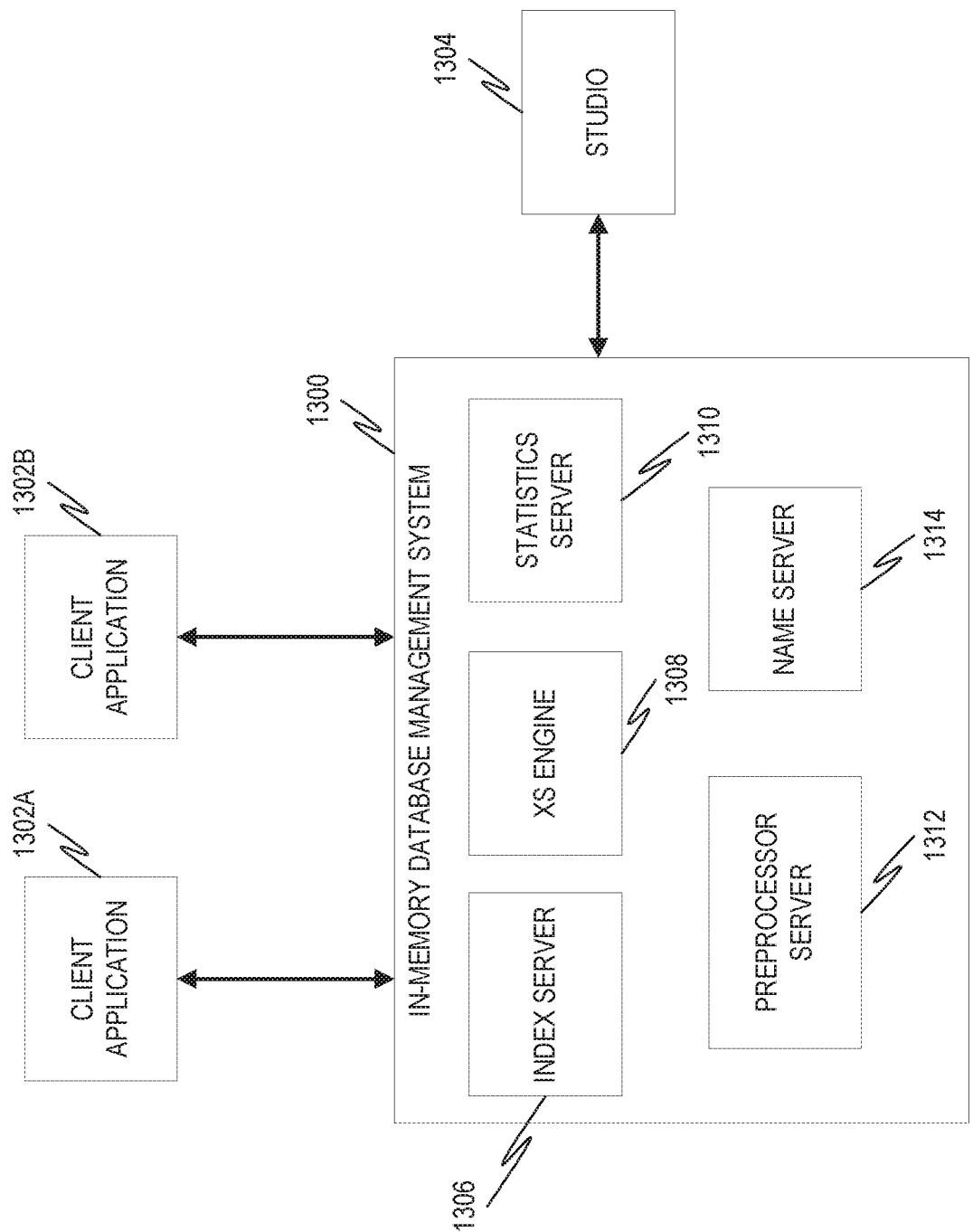
FIG. 13 is a diagram illustrating an example of an in-memory database management system that may be used to implement a web application in some examples of the network virtualization systems and methods described herein.

FIG. 13 is a diagram illustrating an example of an in-memory database management system 1300 that may be used to implement a web application as described here. For example, whereas FIGS. 1-12 describe operations of a web application on the client side, FIG. 13 shows one example implementation with additional details of the server side.

An in-memory database stores data primarily at a main memory, such as a random access memory (RAM). This is different than databases that primarily employ a disk storage mechanism. In some examples, the database management system 1300 may be or include an example of the HANA system from SAP SE of Walldorf, Germany. Although various features of web applications are described herein in the context of an in-memory database, web application security with service workers, as described herein, may be generally implemented for any type of web application.

The in-memory database management system 1300 may be coupled to one or more client applications 1302A, 1302B. For example, client applications 1302A, 1302B may be examples of the web application 106 or other web applications controlled by one or more service workers as described herein. Client applications 1302A, 1302B may execute one or more queries utilizing data from the database including, for example, presenting a user interface (UI) to one or more users, entering data, accessing data, etc. The client applications 1302A, 1302B may communicate with the in-memory database management system 1300 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 13 also shows a studio 1304 that may be used to perform modeling by accessing the in-memory database management system 1300. In some examples, the studio 1304 may allow complex analysis to be performed on data drawn not only from real-time event data and windows, but also from stored database information.

The in-memory database management system 1300 may comprise a number of different components, including an index server 1306, an XS engine 1308, a statistics server 1310, a preprocessor server 1312, and a name server 1314. These components may operate on a single computing device, or may be spread among multiple computing devices (e.g., separate servers). The index server 1306 contains the actual data and the engines for processing the data. It may also coordinate and use the other servers.

The XS engine 1308 allows clients to connect to the in-memory database management system 1300 using web protocols, such as Hypertext Transfer Protocol (HTTP). Although the XS engine 1308 is illustrated as a component of the in-memory database management system 1300, in some examples, the XS engine 1308 may be implemented as one or more Application Program Interfaces (APIs) and/or services positioned between the client applications 1302A, 1302B and the in-memory database management system 1300. For example, the XS engine 1308 may be configured to process client requests received in languages other than SQL such as, for example, Multidimensional Expressions (MDX), Hypertext Transfer Protocol (HTTP), Representational State Transfer (REST), Hypertext Markup Language (HTML), etc.

The statistics server 1310 collects information about status, performance, and resource consumption from all the other server components. The statistics server 1310 can be accessed from the studio 1304 to obtain the status of various alert monitors.

The preprocessor server 1312 is used for analyzing text data and extracting the information on which the text search capabilities are based.

The name server 1314 holds information about the database topology. This is used in a distributed system with instances of the database on different hosts. The name server 1314 knows where the components are running and which data is located on which server. In an example embodiment, a separate enqueue server may operate in the manner described above with respect to enqueue servers, specifically with regard to creating and managing lightweight enqueue sessions.

Figure 14:
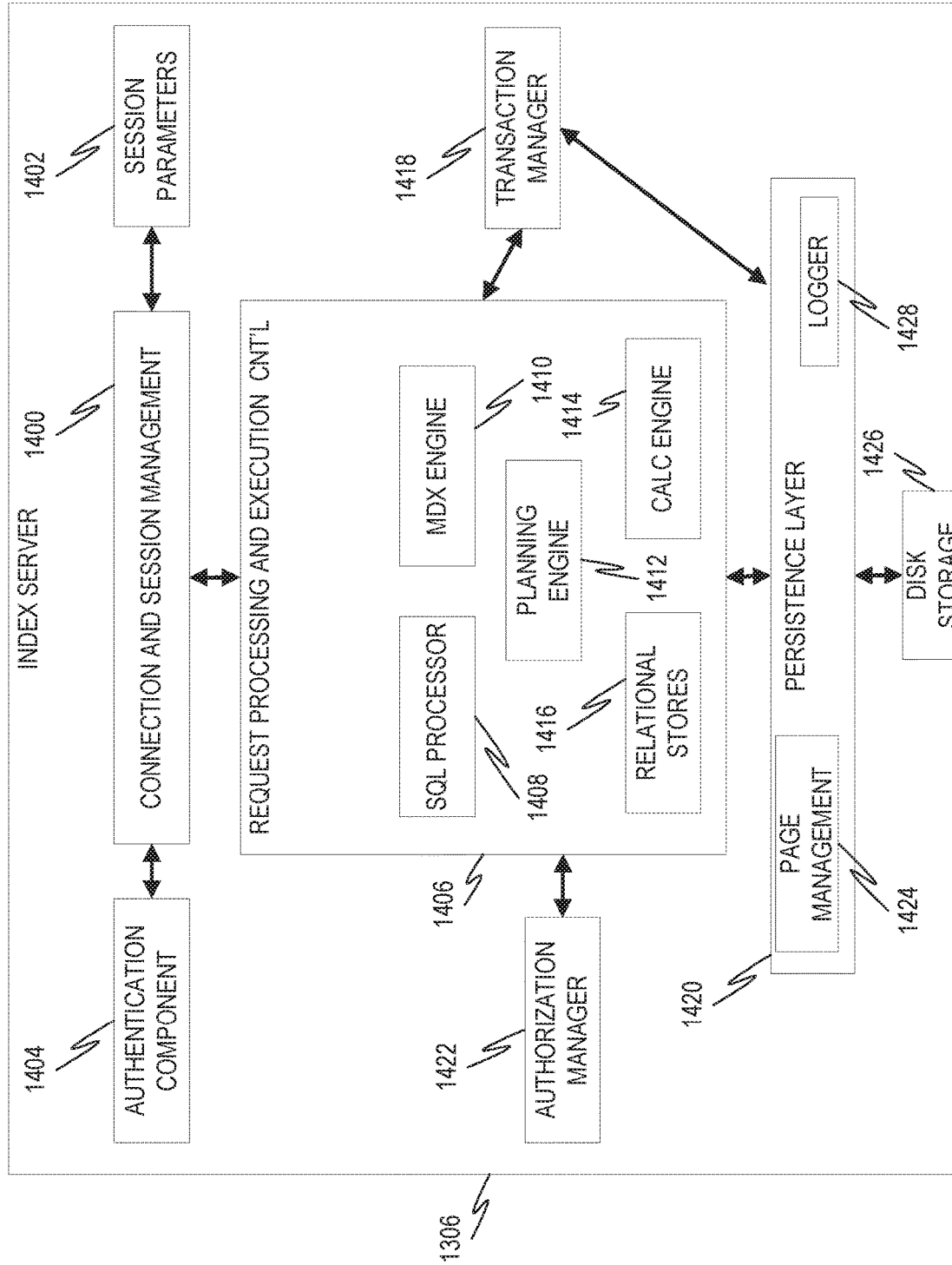
FIG. 14 is a diagram illustrating an example of the index server of FIG. 13.

FIG. 14 is a diagram illustrating an example of the index server 1306. Specifically, the index server 1306 of FIG. 13 is depicted in more detail. The index server 1306 includes a connection and session management component 1400, which is responsible for creating and managing sessions and connections for the database clients (e.g., client applications 1302A, 1302B). Once a session is established, clients can communicate with the database management system 1300 using SQL statements. For each session, a set of session parameters 1402 may be maintained, such as auto-commit, current transaction isolation level, etc. Users (e.g., system administrators, developers) may be authenticated by the database management system 1300 itself (e.g., by logging in with log-in information such as a user name and password, using an authentication component 1404), or authentication can be delegated to an external authentication provider such as a Lightweight Directory Access Protocol (LDAP) directory.

Client queries can be analyzed and executed by a set of components summarized as request processing and execution control 1406. An SQL processor 1408 checks the syntax and semantics of the client SQL statements and generates a logical execution plan. Multidimensional expressions (MDX) is a language for querying and manipulating multidimensional data stored in OLAP cubes. As such, an MDX engine 1410 may be provided to allow for the parsing and executing of MDX commands. A planning engine 1412 allows applications to execute basic planning operations in the database layer. One such operation is to create a new version of a dataset as a copy of an existing dataset, while applying filters and transformations.

A calculation engine 1414 implements the various SQL script and planning operations. The calculation engine 1414 creates a logical execution plan for calculation models derived from SQL script, MDX, planning, and domain-specific models. This logical execution plan may include, for example, breaking up a model into operations that can be processed in parallel. The data is stored in relational stores 1416, which implement a relational database in main memory. Each SQL statement may be processed in the context of a transaction. New sessions are implicitly assigned to a new transaction. A transaction manager 1418 coordinates database transactions, controls transactional isolation, and keeps track of running and closed transactions. When a transaction is committed or rolled back, the transaction manager 1418 informs the involved engines about this event so they can execute needed actions. The transaction manager 1418 also cooperates with a persistence layer 1420 to achieve atomic and durable transactions.

An authorization manager 1422 is invoked by other database system components to check whether the user has the specified privileges to execute the requested operations.

The database management system 1300 allows for the granting of privileges to users or roles. A privilege grants the right to perform a specified operation on a specified object.

The persistence layer 1420 ensures that the database is restored to the most recent committed state after a restart and that transactions are either completely executed or completely undone. To achieve this goal in an efficient way, the persistence layer 1420 uses a combination of write-ahead logs, shadow paging, and save points. The persistence layer 1420 also offers a page management interface 1424 for writing and reading data to a separate disk storage 1426, and also contains a logger 1428 that manages the transaction log. Log entries can be written implicitly by the persistence layer 1420 when data is written via the persistence interface or explicitly by using a log interface.

Figure 15:
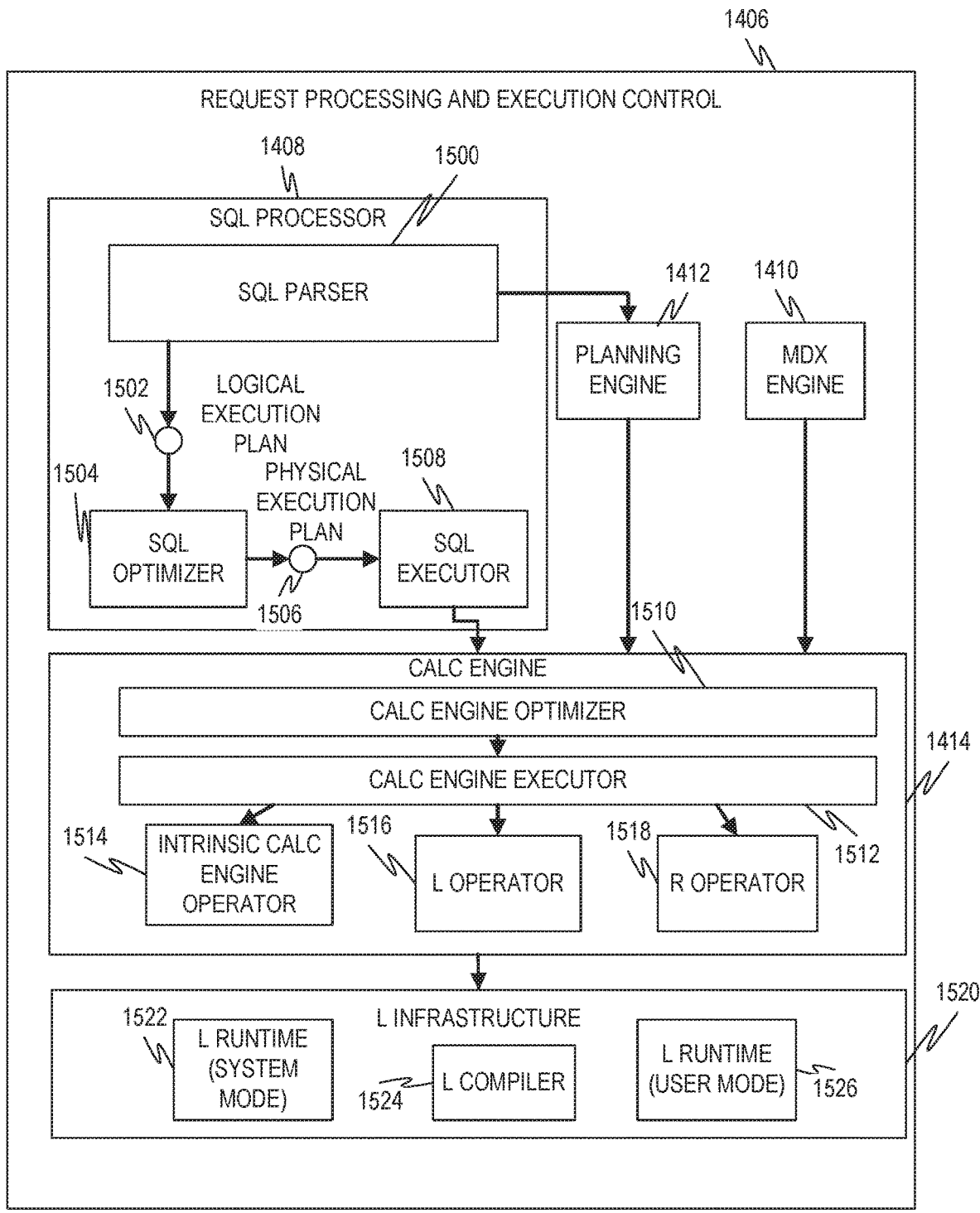
FIG. 15 is a diagram illustrating one example of the request processing and execution control of FIG. 14.

FIG. 15 is a diagram illustrating one example of the request processing and execution control 1406. This diagram depicts the request processing and execution control 1406 of FIG. 14 in more detail. The SQL processor 1408 contains an SQL parser 1500, which parses the SQL statement and generates a logical execution plan 1502, which it passes to an SQL optimizer 1504. The SQL optimizer 1504 optimizes the logical execution plan 1502 and converts it to a physical execution plan 1506, which it then passes to a SQL executor 1508. The calculation engine 1414 implements the various SQL script and planning operations, and includes a calc engine optimizer 1510, which optimizes the operations, and a calc engine executor 1512, which executes the operations, as well as an intrinsic calc engine operator 1514, an L operator 1516, and an R operator 1518.

An L infrastructure 1520 includes a number of components to aid in the running of L procedures, including an L-runtime (system mode) 1522, an L compiler 1524, and an L-runtime (user mode) 1526.

EXAMPLES

Example 1 is a secure communication system comprising: a client computing device comprising a processor and a data storage associated with the processor, wherein the client computing device is programmed to perform operations comprising: receiving, by a session vault routine executing at the client computing device, a first request message directed to a server computing device, wherein the first request message comprises a client session identifier at a session identifier field of the first request message; accessing, by the session vault routine, supplemental session identifier data from a session vault persistence at the data storage, writing the supplemental session identifier data to a second field of the first request message; and initiating, by the session vault routine, sending the first request message to the server computing device with the client session identifier at the session identifier field of the first request message and the supplemental session identifier data at the second field of the first request message.

In Example 2, the subject matter of Example 1 optionally includes wherein the session vault routine is further programmed to perform operations comprising, before writing the supplemental session identifier data to the second field of the first request message, determining that the first request message is not a cross-origin request message.

In Example 3, the subject matter of any one or more of Examples 1-2 optionally includes wherein the session vault routine is further programmed to perform operations comprising: writing the supplemental session identifier data to the second field of the first request message; and determining that the first request message is not an entry-page request message.

In Example 4, the subject matter of any one or more of Examples 1-3 optionally includes wherein the session vault routine is further programmed to perform operations comprising, before writing the supplemental session identifier data to the second field of the first request message, determining that an origin of the first request message is described by white list data.

In Example 5, the subject matter of any one or more of Examples 1-4 optionally includes wherein the session vault routine is further programmed to perform operations comprising: receiving, by the session vault routine, a second request message; determining, by the session vault routine, that the second request message does not includes the client session identifier; and initiating, by the session vault routine, sending the second request message to the server computing device.

In Example 6, the subject matter of any one or more of Examples 1-5 optionally includes wherein the session vault routine is further programmed to perform operations comprising: receiving, by the session vault routine and from the server computing device, a response message comprising a session identifier field and a second field, wherein the session identifier field of the response message comprises the client session identifier and the second field comprises the supplemental session identifier data; removing the supplemental session identifier data from the response message; and initiating sending of the response message to a web application executing at the client computing device without the supplemental session identifier data.

In Example 7, the subject matter of any one or more of Examples 1-6 optionally includes the server computing device, wherein the server computing device is programmed to perform operations comprising: receiving, by a filter executing at the server computing device, the first request message with the client session identifier at the session identifier field of the first request message and the supplemental session identifier data at the second field of the first request message; generating, by the filter, a server session identifier using the client session identifier and the supplemental session identifier data; writing, by the filter, the server session identifier to the session identifier field of the first request message; and initiating, by the filter, sending the first request message to a server routine with the server session identifier at the session identifier field of the first request message.

In Example 8, the subject matter of Example 7 optionally includes wherein the generating of the server session identifier comprises concatenating the client session identifier and at least a portion of the supplemental session identifier data.

In Example 9, the subject matter of any one or more of Examples 7-8 optionally includes wherein the server computing device is also programmed to perform operations comprising: receiving, by the filter, a response message from the server routine, wherein the response message comprises the server session identifier at a session identifier field of the response message; transforming the server session identifier to produce the client session identifier and the supplemental session identifier data; writing the client session identifier to the session identifier field of the response message; writing the supplemental session identifier data to a second field of the response message; and initiating, by the filter, sending the response message to a web application executing at the client computing device with the client session identifier at the session identifier field and the supplemental session identifier data at the second field.

In Example 10, the subject matter of Example 9 optionally includes wherein the client session identifier comprises a first fragment of the server session identifier and the supplemental session identifier data comprises a second fragment of the server session identifier.

Example 11 is a method of secure communication between a web application and a server, comprising: receiving, by a session vault routine executing at a client computing device, a first request message directed to a server computing device, wherein the first request message comprises a client session identifier at a session identifier field of the first request message; accessing, by the session vault routine, supplemental session identifier data from a session vault persistence at a data storage of the client computing device; writing the supplemental session identifier data to a second field of the first request message; and initiating, by the session vault routine, sending the first request message to the server computing device with the client session identifier at the session identifier field of the first request message and the supplemental session identifier data at the second field of the first request message.

In Example 12, the subject matter of Example 11 optionally includes before writing the supplemental session identifier data to the second field of the first request message, determining, by the session vault routine, that the first request message is not a cross-origin request message.

In Example 13, the subject matter of any one or more of Examples 11-12 optionally includes before writing the supplemental session identifier data to the second field of the first request message, determining, by the session vault routine, that the first request message is not an entry-page request message.

In Example 14, the subject matter of any one or more of Examples 11-13 optionally includes before writing the supplemental session identifier data to the second field of the first request message, determining, by the session vault routine, that an origin of the first request message is described by white list data.

In Example 15, the subject matter of any one or more of Examples 11-14 optionally includes receiving, by the session vault routine, a second request message; determining, by the session vault routine, that the second request message does not include the client session identifier; and initiating, by the session vault routine, sending the second request message to the server computing device.

In Example 16, the subject matter of any one or more of Examples 11-15 optionally includes receiving, by the session vault routine and from the server computing device, a response message comprising a session identifier field and a second field, wherein the session identifier field of the response message comprises the client session identifier and the second field comprises the supplemental session identifier data; removing the supplemental session identifier data from the response message; and initiating sending of the response message to a web application executing at the client computing device without the supplemental session identifier data.

Example 17 is a machine-readable medium comprising instructions stored thereon that, when executed by a computing device, causes the computing device to execute operations comprising: receiving, by a session vault routine executing at the computing device, a first request message directed to a server computing device, wherein the first request message comprises a client session identifier at a session identifier field of the first request message; accessing, by the session vault routine, supplemental session identifier data from a session vault persistence at a data storage of the computing device; writing the supplemental session identifier data to a second field of the first request message; and initiating, by the session vault routine, sending the first request message to the server computing device with the client session identifier at the session identifier field of the first request message and the supplemental session identifier data at the second field of the first request message.

In Example 18, the subject matter of Example 17 optionally includes instructions stored thereon that, when executed by a computing device, causes the computing device to execute operations comprising, before writing the supplemental session identifier data to the second field of the first request message, determining, by the session vault routine, that the first request message is not a cross-origin request message.

In Example 19, the subject matter of any one or more of Examples 17-18 optionally includes instructions stored thereon that, when executed by a computing device, causes the computing device to execute operations comprising: receiving, by the session vault routine, a second request message; determining, by the session vault routine, that the second request message does not includes the client session identifier; and initiating, by the session vault routine, sending the second request message to the server computing device.

In Example 20, the subject matter of any one or more of Examples 17-19 optionally includes instructions stored thereon that, when executed by a computing device, causes the computing device to execute operations comprising: receiving, by the session vault routine and from the server computing device, a response message comprising a session identifier field and a second field, wherein the session identifier field of the response message comprises the client session identifier and the second field comprises the supplemental session identifier data; removing the supplemental session identifier data from the response message; and initiating sending of the response message to a web application executing at the computing device without the supplemental session identifier data.

Figure 16:
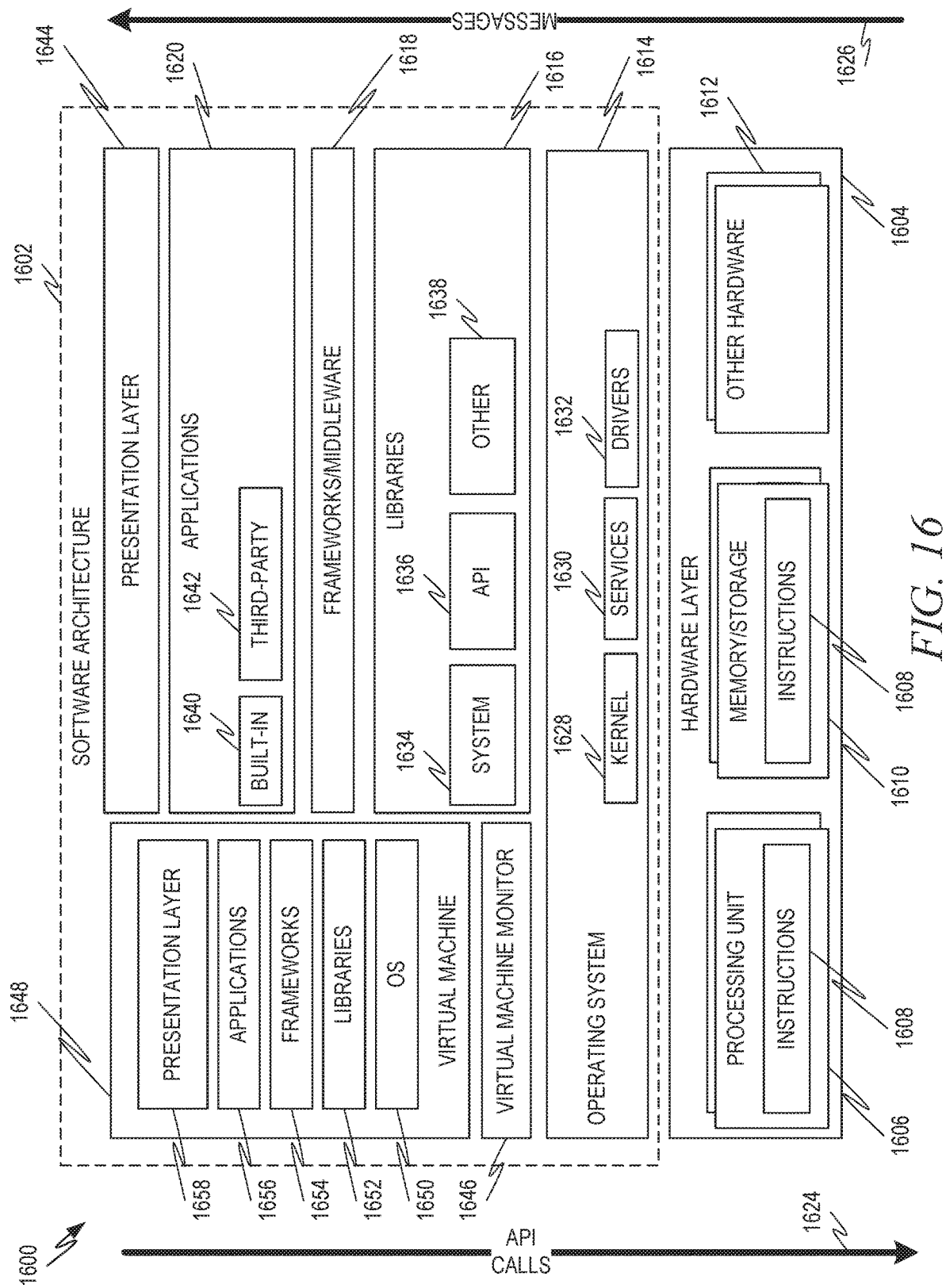
FIG. 16 is a block diagram showing one example of a software architecture for a computing device.

FIG. 16 is a block diagram 1600 showing one example of a software architecture 1602 for a computing device. The architecture 1602 may be used in conjunction with various hardware architectures, for example, as described herein. FIG. 16 is merely a non-limiting example of a software architecture and many other architectures may be implemented to facilitate the functionality described herein. A representative hardware layer 1604 is illustrated and can represent, for example, any of the above referenced computing devices. In some examples, the hardware layer 1604 may be implemented according to the architecture of the computer system 1700 of FIG. 17.

The representative hardware layer 1604 comprises one or more processing units 1606 having associated executable instructions 1608. Executable instructions 1608 represent the executable instructions of the software architecture 1602, including implementation of the methods, modules, subsystems, and components, and so forth described herein and may also include memory and/or storage modules 1610, which also have executable instructions 1608. Hardware layer 1604 may also comprise other hardware as indicated by other hardware 1612, which represents any other hardware of the hardware layer 1604, such as the other hardware illustrated as part of computer system 1700.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620 and presentation layer 1644. Operationally, the applications 1620 and/or other components within the layers may invoke application programming interface (API) calls 1624 through the software stack and access a response, returned values, and so forth illustrated as messages 1626 in response to the API calls 1624. The layers illustrated are representative in nature and not all software architectures have all layers. For example, some mobile or special purpose operating systems may not provide a frameworks/middleware layer 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. In some examples, the services 1630 include an interrupt service. The interrupt service may detect the receipt of an interrupt and, in response, cause the architecture 1602 to pause its current processing and execute an interrupt service routine (ISR) when an interrupt is accessed.

The drivers 1632 may be responsible for controlling or interfacing with the underlying hardware. For instance, the drivers 1632 may include display drivers, camera drivers, Bluetooth, drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1616 may provide a common infrastructure that may be utilized by the applications 1620 and/or other components and/or layers. The libraries 1616 typically provide functionality that allows other software modules to perform tasks in an easier fashion than to interface directly with the underlying operating system 1614 functionality (e.g., kernel 1628, services 1630 and/or drivers 1632). The libraries 1616 may include system libraries 1634 (e.g., C standard library) that may provide functions such as memory allocation functions, string manipulation functions, mathematic functions, and the like. In addition, the libraries 1616 may include API libraries 1636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 1616 may also include a wide variety of other libraries 1638 to provide many other APIs to the applications 1620 and other software components/modules. In some examples, libraries 1616 may provide one or more APIs serviced by a message oriented middleware.

The frameworks 1618 (also sometimes referred to as middleware) may provide a higher-level common infrastructure that may be utilized by the applications 1620 and/or other software components/modules. For example, the frameworks 1618 may provide various graphic user interface (GUI) functions, high-level resource management, high-level location services, and so forth. The frameworks 1618 may provide a broad spectrum of other APIs that may be utilized by the applications 1620 and/or other software components/modules, some of which may be specific to a particular operating system or platform.

The applications 1620 include built-in applications 1640 and/or third-party applications 1642. Examples of representative built-in applications 1640 may include, but are not limited to, a contacts application, a browser application, a book reader application, a location application, a media application, a messaging application, and/or a game application. Third-party applications 1642 may include any of the built-in applications 1640 as well as a broad assortment of other applications. In a specific example, the third-party application 1642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1642 may invoke the API calls 1624 provided by the mobile operating system such as operating system 1614 to facilitate functionality described herein.

The applications 1620 may utilize built-in operating system functions (e.g., kernel 1628, services 1630 and/or drivers 1632), libraries (e.g., system 1634, APIs 1636, and other libraries 1638), frameworks/middleware 1618 to create user interfaces to interact with users of the system. Alternatively, or additionally, in some systems interactions with a user may occur through a presentation layer, such as presentation layer 1644. In these systems, the application/module "logic" can be separated from the aspects of the application/module that interact with a user.

Some software architectures utilize virtual machines. In the example of FIG. 16, this is illustrated by virtual machine 1648. A virtual machine creates a software environment where applications/modules can execute as if they were executing on a hardware computing device. A virtual machine 1648 is hosted by a host operating system (operating system 1614) and typically, although not always, has a virtual machine monitor 1646, which manages the operation of the virtual machine 1648 as well as the interface with the host operating system (i.e., operating system 1614). A software architecture executes within the virtual machine 1648 such as an operating system 1650, libraries 1652, frameworks/middleware 1654, applications 1656 and/or presentation layer 1658. These layers of software architecture executing within the virtual machine 1648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 17:
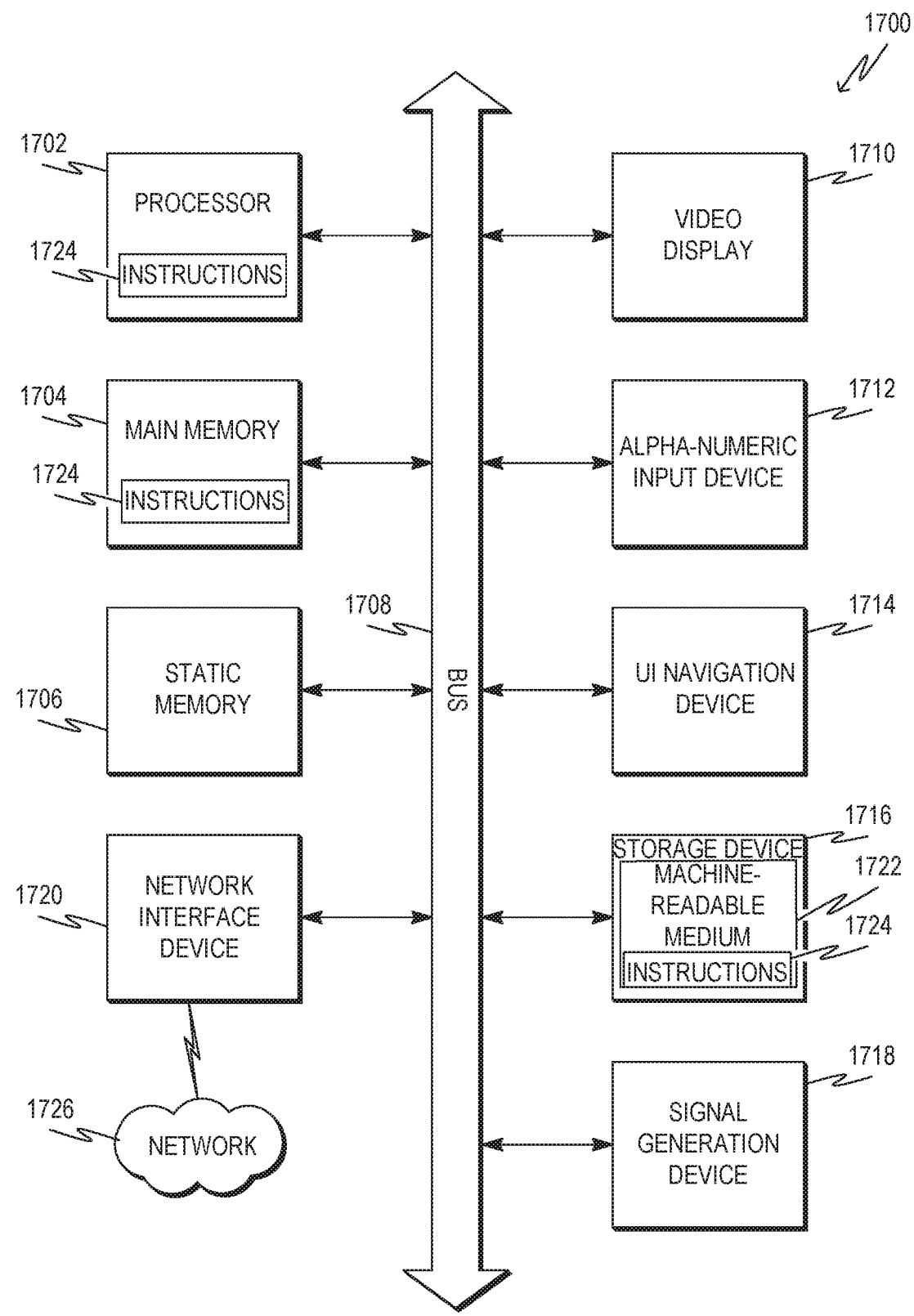
FIG. 17 is a block diagram of a machine in the example form of a computer system within which instructions may be executed for causing the machine to perform any one or more of the methodologies discussed herein.

FIG. 17 is a block diagram of a machine in the example form of a computer system 1700 within which instructions 1724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU), or both), a main memory 1704, and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation (or cursor control) device 1714 (e.g., a mouse), a disk drive device 1716, a signal generation device 1718 (e.g., a speaker), and a network interface device 1720.

Machine-Readable Medium

The disk drive device 1716 includes a machine-readable medium 1722 on which is stored one or more sets of data structures and instructions 1724 (e.g., software) embodying or utilized by any one or more of the methodologies or functions described herein. The instructions 1724 may also reside, completely or at least partially, within the main memory 1704 and/or within the processor 1702 during execution thereof by the computer system 1700, with the main memory 1704 and the processor 1702 also constituting machine-readable media 1722.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding, or carrying instructions 1724 for execution by the machine and that cause the machine to perform any one or more of the methodologies of the present disclosure, or that is capable of storing, encoding, or carrying data structures utilized by or associated with such instructions 1724. The term "machine-readable medium" shall accordingly be taken to include, but not be limited to, solid-state memories, and optical and magnetic media. Specific examples of machine-readable media 1722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A secure communication system comprising:
   a client computing device comprising a processor and a data storage associated with the processor, wherein the client computing device is programmed to perform operations comprising:
   receiving, by a session vault routine executing at the client computing device, a first request message directed to a server computing device, wherein the first request message comprises a client session identifier at a session identifier field of the first request message;
   accessing, by the session vault routine, supplemental session identifier data from a session vault persistence at the data storage;

writing the supplemental session identifier data to a second field of the first request message; and initiating, by the session vault routine, sending the first request message to the server computing device with the client session identifier at the session identifier field of the first request message and the supplemental session identifier data at the second field of the first request message;

the server computing device, wherein the server computing device is programmed to perform operations comprising:

receiving, by a filter executing at the server computing device, the first request message with the client session identifier at the session identifier field of the first request message and the supplemental session identifier data at the second field of the first request message;

generating, by the filter, a server session identifier using the client session identifier and the supplemental session identifier data;

writing, by the filter, the server session identifier to the session identifier field of the first request message; and initiating, by the filter, sending the first request message to a server routine with the server session identifier at the session identifier field of the first request message.

2. The system of claim 1, wherein the server computing device is also programmed to perform operations comprising:

receiving, by the filter, a response message from the server routine, wherein the response message comprises the server session identifier at a session identifier field of the response message;

transforming the server session identifier to produce the client session identifier and the supplemental session identifier data;

writing the client session identifier to the session identifier field of the response message;

writing the supplemental session identifier data to a second field of the response message; and initiating, by the filter, sending the response message to a web application executing at the client computing device with the client session identifier at the session identifier field and the supplemental session identifier data at the second field.

3. The system of claim 2, wherein the client session identifier comprises a first fragment of the server session identifier and the supplemental session identifier data comprises a second fragment of the server session identifier.

4. The system of claim 1, wherein the session vault routine is further programmed to perform operations comprising, before writing the supplemental session identifier data to the second field of the first request message, determining that the first request message is not a cross-origin request message.

5. The system of claim 1, wherein the session vault routine is further programmed to perform operations comprising:

writing the supplemental session identifier data to the second field of the first request message; and determining that the first request message is not an entry-page request message.

6. The system of claim 1, wherein the session vault routine is further programmed to perform operations comprising, before writing the supplemental session identifier data to the second field of the first request message, determining that an origin of the first request message is described by white list data.

7. The system of claim 1, wherein the session vault routine is further programmed to perform operations comprising:

receiving, by the session vault routine, a second request message;

determining, by the session vault routine, that the second request message does not include the client session identifier; and initiating, by the session vault routine, sending the second request message to the server computing device.

8. The system of claim 1, wherein the session vault routine is further programmed to perform operations comprising:

receiving, by the session vault routine and from the server computing device, a response message comprising a session identifier field and a second field, wherein the session identifier field of the response message comprises the client session identifier and the second field comprises the supplemental session identifier data;

removing the supplemental session identifier data from the response message; and initiating sending of the response message to a web application executing at the client computing device without the supplemental session identifier data.

9. The system of claim 1, wherein the generating of the server session identifier comprises concatenating the client session identifier and at least a portion of the supplemental session identifier data.

10. A method of secure communication between a web application and a server, comprising:

receiving, by a session vault routine executing at a client computing device, a first request message directed to a server computing device, wherein the first request message comprises a client session identifier at a session identifier field of the first request message;

accessing, by the session vault routine, supplemental session identifier data from a session vault persistence at a data storage of the client computing device;

writing the supplemental session identifier data to a second field of the first request message;

initiating, by the session vault routine, sending the first request message to the server computing device with the client session identifier at the session identifier field of the first request message and the supplemental session identifier data at the second field of the first request message receiving, by a filter executing at a server computing device, the first request message with the client session identifier at the session identifier field of the first request message and the supplemental session identifier data at the second field of the first request message;

generating, by the filter, a server session identifier using the client session identifier and the supplemental session identifier data;

writing, by the filter, the server session identifier to the session identifier field of the first request message; and initiating, by the filter, sending the first request message to a server routine with the server session identifier at the session identifier field of the first request message.

11. The method of claim 10, further comprising, before writing the supplemental session identifier data to the second field of the first request message, determining, by the session vault routine, that the first request message is not a cross-origin request message.

12. The method of claim 10, further comprising, before writing the supplemental session identifier data to the second field of the first request message, determining, by the session vault routine, that the first request message is not an entry-page request message.

13. The method of claim 10, further comprising, before writing the supplemental session identifier data to the second field of the first request message, determining, by the session vault routine, that an origin of the first request message is described by white list data.

14. The method of claim 10, further comprising:
receiving, by the session vault routine, a second request message;
determining, by the session vault routine, that the second request message does not include the client session identifier; and
initiating, by the session vault routine, sending the second request message to the server computing device.

15. The method of claim 10, further comprising:
receiving, by the session vault routine and from the server computing device, a response message comprising a session identifier field and a second field, wherein the session identifier field of the response message comprises the client session identifier and the second field comprises the supplemental session identifier data;
removing the supplemental session identifier data from the response message; and
initiating sending of the response message to a web application executing at the client computing device without the supplemental session identifier data.

16. A non-transitory machine-readable medium comprising instructions stored thereon that, when executed by a computing device, causes the computing device to execute operations comprising:
receiving, by a session vault routine executing at the computing device, a first request message directed to a server computing device, wherein the first request message comprises a client session identifier at a session identifier field of the first request message;
accessing, by the session vault routine, supplemental session identifier data from a session vault persistence at a data storage of the computing device;
writing the supplemental session identifier data to a second field of the first request message; and
initiating, by the session vault routine, sending the first request message to the server computing device with the client session identifier at the session identifier field of the first request message and the supplemental session identifier data at the second field of the first request message
receiving, by a filter executing at a server computing device, the first request message with the client session identifier at the session identifier field of the first request message and the supplemental session identifier data at the second field of the first request message;
generating, by the filter, a server session identifier using the client session identifier and the supplemental session identifier data;
writing, by the filter, the server session identifier to the session identifier field of the first request message; and
initiating, by the filter, sending the first request message to a server routine with the server session identifier at the session identifier field of the first request message.

17. The medium of claim 16, further comprising instructions stored thereon that, when executed by a computing device, causes the computing device to execute operations comprising, before writing the supplemental session identifier data to the second field of the first request message, determining, by the session vault routine, that the first request message is not a cross-origin request message.

18. The medium of claim 16, further comprising instructions stored thereon that, when executed by a computing device, causes the computing device to execute operations comprising:
receiving, by the session vault routine, a second request message;
determining, by the session vault routine, that the second request message does not include the client session identifier; and
initiating, by the session vault routine, sending the second request message to the server computing device.

19. The medium of claim 16, further comprising instructions stored thereon that, when executed by a computing device, causes the computing device to execute operations comprising:
receiving, by the session vault routine and from the server computing device, a response message comprising a session identifier field and a second field, wherein the session identifier field of the response message comprises the client session identifier and the second field comprises the supplemental session identifier data;
removing the supplemental session identifier data from the response message; and
initiating sending of the response message to a web application executing at the computing device without the supplemental session identifier data.

20. The medium of claim 16, further comprising instructions stored thereon that, when executed by a computing device, causes the computing device to execute operations comprising:
receiving, by the session vault routine, a second request message;
determining, by the session vault routine, that the second request message does not include the client session identifier; and
initiating, by the session vault routine, sending the second request message to the server computing device.

* * * * *